(12) United States Patent
Pernu

(10) Patent No.: US 8,521,096 B2
(45) Date of Patent: Aug. 27, 2013

(54) RADIO ACCESS CONTROL UTILIZING QUALITY OF SERVICE ACCESS WINDOWS

(75) Inventor: Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 641 days.

(21) Appl. No.: 12/810,492

(22) PCT Filed: Oct. 19, 2007

(86) PCT No.: PCT/IB2007/054272
§ 371 (c)(1),
(2), (4) Date: Aug. 3, 2010

(87) PCT Pub. No.: WO2009/050539
PCT Pub. Date: Apr. 23, 2009

(65) Prior Publication Data
US 2011/0021146 A1   Jan. 27, 2011

(51) Int. Cl.
*H04B 17/00* (2006.01)
(52) U.S. Cl.
USPC ............... 455/67.13; 455/67.11; 455/450; 455/41.2; 455/552.1; 455/452.1; 455/63.1; 455/501; 370/338; 370/310; 370/444; 370/329; 370/345; 375/222
(58) Field of Classification Search
USPC ............ 455/67.13, 552.1, 450, 41.2, 557, 455/556.1, 67.11, 452.1, 501, 63.1; 370/230, 370/252, 328–329, 338, 236, 345, 444
See application file for complete search history.

(56) References Cited

U.S. PATENT DOCUMENTS

| | | | | |
|---|---|---|---|---|
| 6,590,878 B1 * | 7/2003 | Uchida et al. | ............... | 370/330 |
| 7,114,010 B2 * | 9/2006 | Karaoguz et al. | ............ | 709/250 |
| 7,257,099 B2 * | 8/2007 | Myojo | ............... | 370/329 |
| 7,289,468 B2 * | 10/2007 | Yang et al. | ............... | 370/329 |
| 7,317,682 B2 * | 1/2008 | Gu et al. | ............... | 370/230 |
| 7,457,634 B2 * | 11/2008 | Morinaga et al. | .......... | 455/550.1 |
| 7,506,043 B2 * | 3/2009 | Ali et al. | ............... | 709/223 |
| 7,519,038 B2 | 4/2009 | Zhao et al. | | |
| 7,653,397 B2 * | 1/2010 | Pernu et al. | ............... | 455/450 |
| 7,657,286 B2 * | 2/2010 | Kasslin et al. | ............... | 455/557 |
| 7,664,532 B2 * | 2/2010 | Palin et al. | ............... | 455/557 |
| 7,668,565 B2 * | 2/2010 | Ylanen et al. | ............... | 455/553.1 |
| 7,711,373 B2 * | 5/2010 | Kasslin et al. | ............... | 455/450 |
| 7,809,012 B2 * | 10/2010 | Ruuska et al. | ............... | 370/449 |
| 7,848,741 B2 * | 12/2010 | Kivekas et al. | ............... | 455/423 |

(Continued)

OTHER PUBLICATIONS

International Search Report and Written Opinion mailed on Sep. 26, 2008, for corresponding PCT Application No. PCT/IB2007/054272, 15 pages.

(Continued)

*Primary Examiner* — Marceau Milord
(74) *Attorney, Agent, or Firm* — Locke Lord LLP

(57) ABSTRACT

A system for managing the operation of a plurality of radio modules (1200), in the same device (100). A controller (600) may receive information pertaining to a plurality of wireless communication mediums being supported by radio modules (1200) in the device. The multiradio controller may formulate an operational schedule for the wireless communication mediums based on this information. Further, a network controller (1202) for a network may provide information related to one or more time periods during which the device may operate. This network information may be received by the device and also considered by the multiradio controller, which may further request that one or more of these time periods be altered, in the device, so as to align with the operational schedule.

22 Claims, 24 Drawing Sheets

(56) References Cited

U.S. PATENT DOCUMENTS

| | | | | |
|---|---|---|---|---|
| 7,889,756 | B2* | 2/2011 | Pernu | 370/444 |
| 7,920,495 | B2* | 4/2011 | Salokannel et al. | 370/310 |
| 7,949,364 | B2* | 5/2011 | Kasslin et al. | 455/552.1 |
| 7,953,397 | B2* | 5/2011 | Jessen et al. | 455/415 |
| 8,005,465 | B2* | 8/2011 | Salokannel et al. | 455/414.1 |
| 8,107,880 | B2* | 1/2012 | Okker et al. | 455/41.2 |
| 8,107,968 | B2* | 1/2012 | Kasslin et al. | 455/451 |
| 8,254,253 | B2* | 8/2012 | Forssell | 370/230 |
| 8,265,039 | B2* | 9/2012 | Reza et al. | 370/332 |
| 8,265,712 | B2* | 9/2012 | Pernu et al. | 455/574 |
| 8,315,234 | B2* | 11/2012 | Sohrabi | 370/338 |
| 8,325,703 | B2* | 12/2012 | Pernu | 370/350 |
| 8,345,704 | B2* | 1/2013 | Desai et al. | 370/438 |
| 2002/0059434 | A1* | 5/2002 | Karaoguz et al. | 709/228 |
| 2003/0031129 | A1* | 2/2003 | Dutkiewicz | 370/230 |
| 2003/0185214 | A1* | 10/2003 | Yang et al. | 370/395.4 |
| 2005/0020299 | A1* | 1/2005 | Malone et al. | 455/552.1 |
| 2006/0002428 | A1* | 1/2006 | Trainin | 370/503 |
| 2007/0195787 | A1* | 8/2007 | Alnuweiri et al. | 370/395.4 |
| 2008/0309490 | A1* | 12/2008 | Honkanen et al. | 340/572.1 |

OTHER PUBLICATIONS

LAN/MAN Standards Committee, "Local and Metropolitan Area Networks—Specific Requirements; Part 11: Wireless LAN Medium Access Control, (MAC) and Physical Layer (PHY) specifications; Amendment 8: Medium Access Control (MAC) Quality of Service Enhancements; IEEE Std. 802.11e-2005", 210 pages.

* cited by examiner

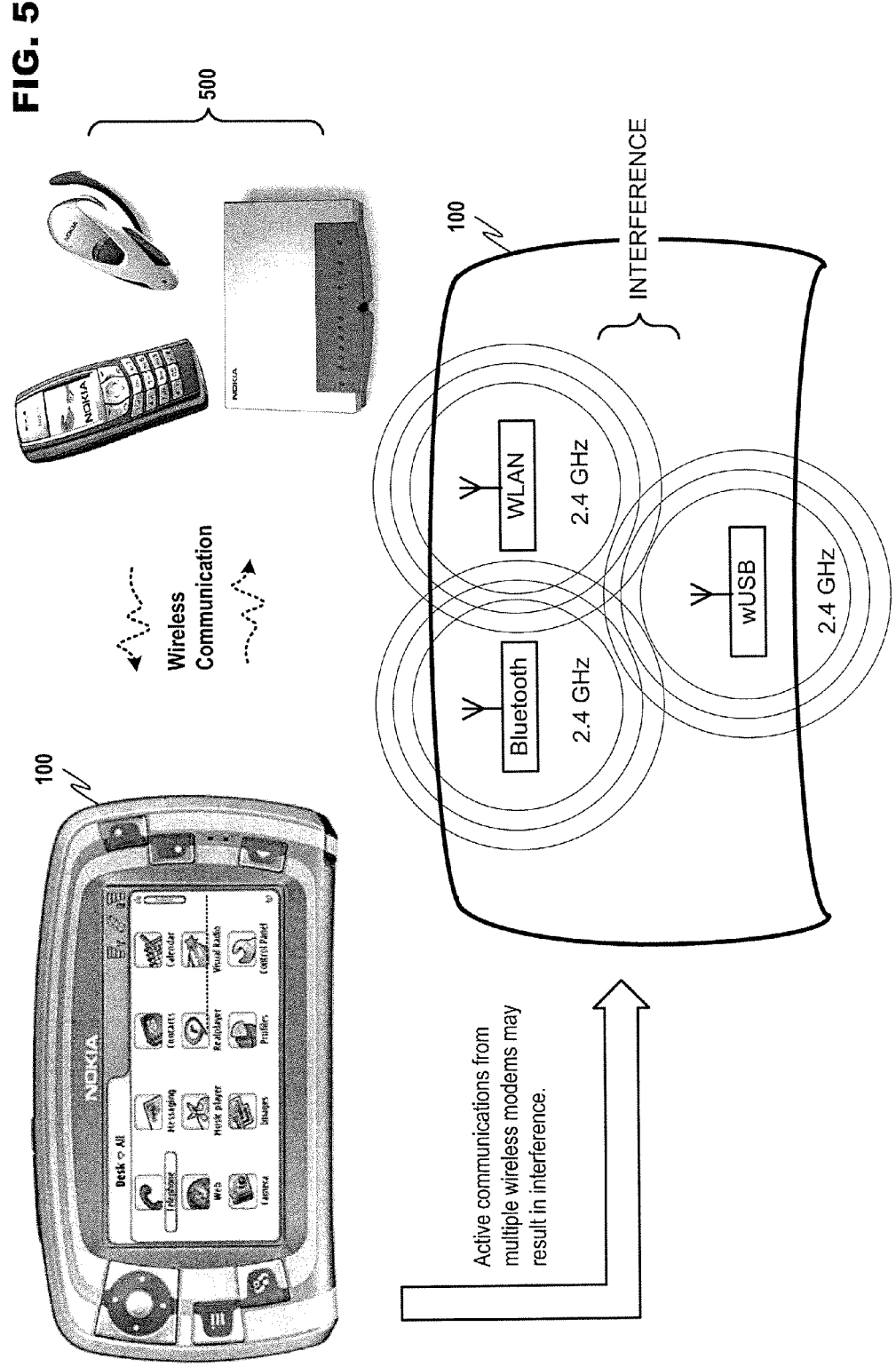

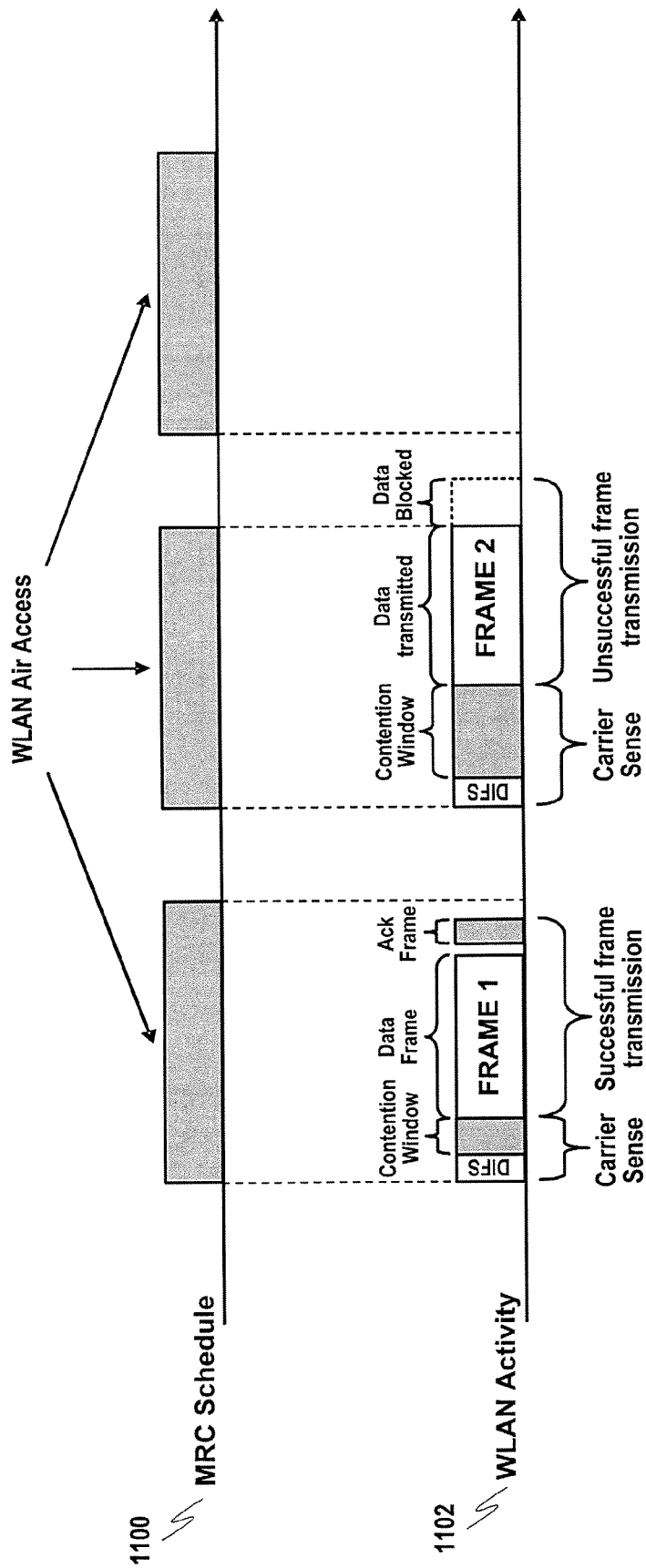

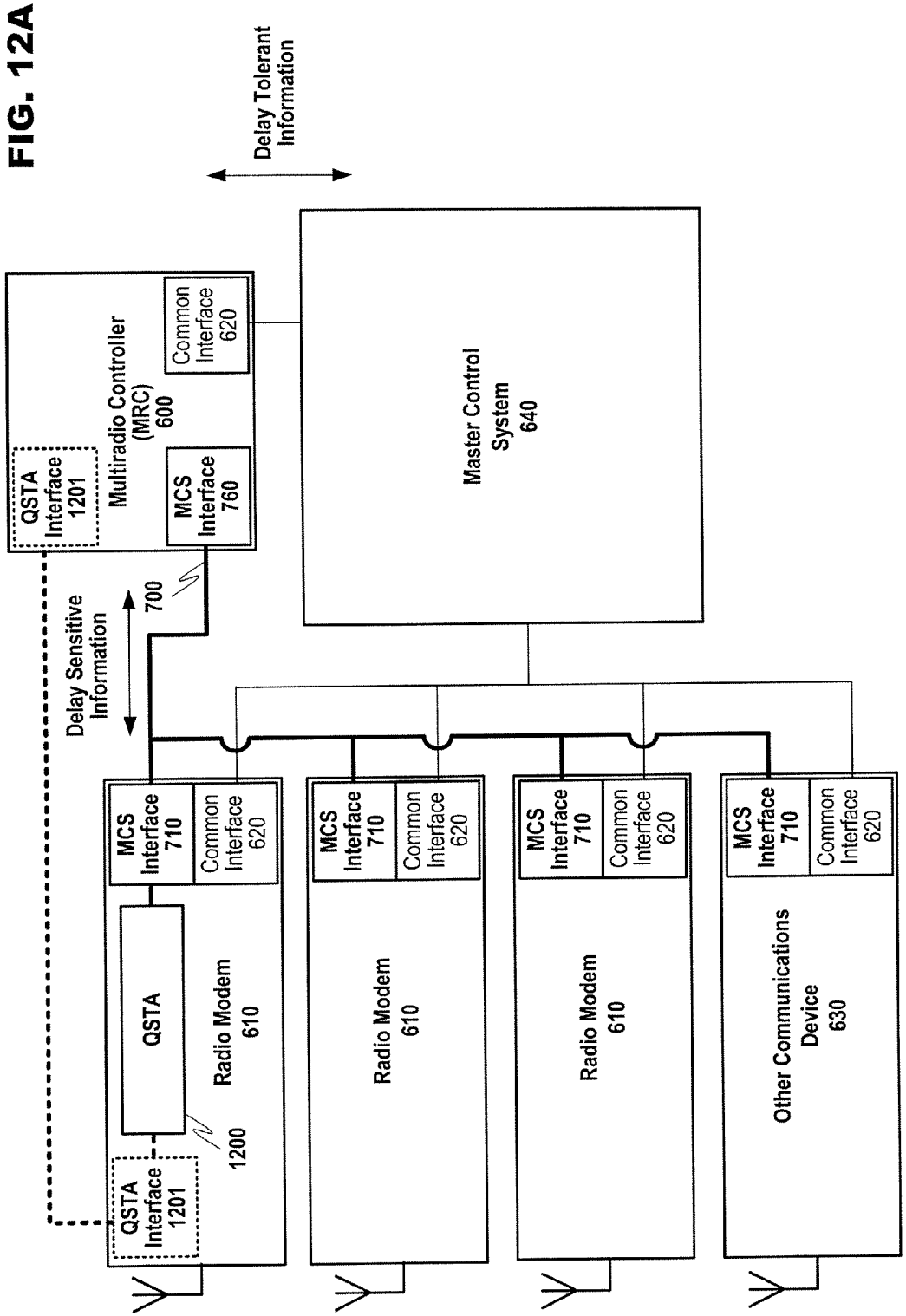

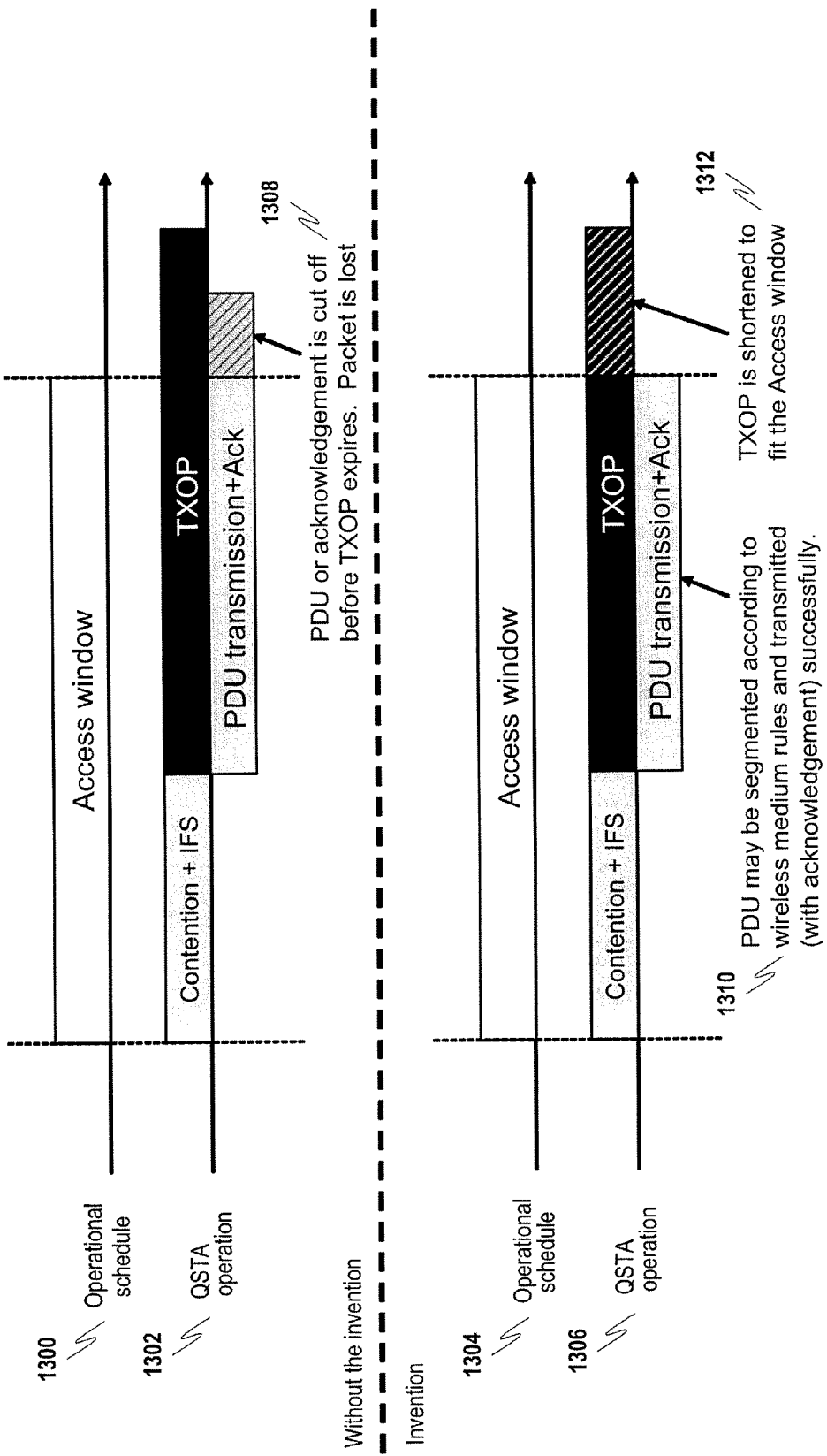

_US 8,521,096 B2_

RADIO ACCESS CONTROL UTILIZING QUALITY OF SERVICE ACCESS WINDOWS

RELATED APPLICATION

This application was originally filed as PCT Application No. PCT/IB2007/054272 filed Oct. 19, 2007.

BACKGROUND OF INVENTION

1. Field of Invention

The present invention relates to a system for managing multiple radio modems integrated within a wireless communication device, and more specifically, to a multiradio control system that may enhance multiradio operation by aligning timeslots allocated at a network-level for a wireless communication medium with timeslots allocated at a device-level in the wireless communication device.

2. Background

Modern society has quickly adopted, and become reliant upon, handheld devices for wireless communication. For example, cellular telephones continue to proliferate in the global marketplace due to technological improvements in both the communication quality and device functionality. These wireless communication devices (WCDs) have become common for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receives data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near field communication (NFC) technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

Manufacturers continue to incorporate as many of the previously discussed exemplary communication features as possible into wireless communication devices in an attempt to bring powerful, "do-all" devices to market. Devices incorporating long-range, short-range and NFC resources often support multiple mediums in each category. This may allow a WCD to flexibly adjust to its surroundings, for example, communicating both with a WLAN access point and a Bluetooth™ communication accessory, possibly at the same time.

Given the large array communication features that may be compiled into a single device, it is foreseeable that a user will need to employ a WCD to its full potential when replacing other productivity related devices. For example, a user may utilize a fully-functioned WCD to replace traditional tools such as individual phones, facsimile machines, computers, storage media, etc., which tend to be cumbersome to both integrate and transport. In one scenario, a WCD may communicate simultaneously over a plurality of different wireless mediums. A user may utilize multiple peripheral Bluetooth™ devices (e.g., a headset, keyboard, etc.) while having a voice conversation over GSM and interacting with a WLAN access point in order to access the Internet. Problems may occur when these communications interfere with each other. Even if wireless communication mediums do not have identical operating frequencies, a radio modem may cause extraneous interference to another medium. Further, it is possible for the combined effects of two or more concurrently operating radios to create intermodulation in another bandwidth due to harmonic effects. These disturbances may cause errors resulting in the required retransmission of lost packets, and the overall degradation of performance for one or more communication mediums.

Evolving strategies for regulating air time between two or more radio modems contained in the same device often require a centralized (as a single component or distributed among various components) communication control enforcing an operational schedule for all wireless activity, the regulation of which helps to reduce potential communication collisions between active radio modems. However, in order for an operational schedule to be effective, the interplay of radio modem activity must be precisely controlled. Precision may be derived from the communication control being synchronized with the modems by, for example, knowing the communication backlog and timing patterns of the active radio modems.

While centrally-controlled wireless resource management may be effective in optimizing some wireless communication mediums, other wireless mediums may continue to be problematic. For example, wireless protocols that are enabled for carrying synchronous data may operate in a mode that uses fixed transmission and reception intervals, like GSM and Bluetooth™, may be more readily managed by a centralized controller because a schedule may be precisely defined without requiring large buffer time periods. However, other wireless mediums are not so predictive (e.g., WLAN). These unscheduled wireless mediums must compete for available transactional timeslots, and as a result, may require longer execution time to allow for determination of carrier availability. These determination periods, or contention periods, add to the time needed to complete a transaction wherein both a message frame is sent and also an acknowledgement frame must be received. If both of these frames are not sent/received in the time available, the message is considered a failure, which may waste time in two ways: time is wasted by the failed WLAN message attempt (this time could have been successfully used by another wireless medium), and further, time is wasted in attempting to transmit the WLAN message again, which may also fail. Further, due to the dynamic nature of these contention periods there is no absolute way for predicting how long a certain contention period will last before access to the wireless medium is obtained, so the time needed for transmitting certain packet cannot be defined beforehand, which makes it difficult to provide an operational schedule for such a wireless medium.

SUMMARY OF INVENTION

The present invention includes at least a method, device, computer program and system for managing the operation of a plurality of radio modules in the same WCD. In at least one embodiment of the present invention, a multiradio controller may receive information pertaining to a plurality of wireless communication mediums being supported by one or more radio modules in the device. The multiradio controller may formulate an operational schedule for the wireless communication mediums based on this information. Further, a network controller for a network including at least one radio module in the WCD may provide information related to one or more time periods during which the radio module may operate. This network information may be received by the radio module and also considered by the multiradio controller, which may further request that one or more of these time periods be altered, in the WCD, so as to align with the operational schedule.

The multiradio controller may, in various embodiments, receive status information for each wireless communication medium. This information may include data about messages pending for each wireless communication medium such as a number of pending messages, age of pending messages, priority of pending messages, the source of the pending messages, etc. The multiradio controller may use this information to create an operational schedule for each wireless communication medium, wherein time slots may be assigned to each wireless communication mediums during which communication is allowed.

Further, some exemplary radio modules may receive transmit opportunity information from an external network controller for a particular wireless communication medium. The transmit opportunity corresponds to timeslots reserved at a network level during which a radio module is permitted to communicate on the network of a particular wireless communication medium. The multiradio controller may consider the timeslots reserved at the network level in order to determine how they correspond to the timeslots reserved for the particular wireless communication medium at the device level (e.g., in the operational schedule). A scenario may exist where the device-level multiradio schedule cuts off access to a radio module before the network level timeslot is complete for the particular wireless communication medium. Since the device-level schedule has priority over network-level timeslots, messages formulated to be sent in view of the full duration of the network timeslot may be terminated prematurely. In order to avoid this scenario, the multiradio controller may request or implement a change to shorten one or more network timeslots locally in the WCD so that the network and device timeslots may terminate at the same time.

Unscheduled wireless communication mediums may implement a contention period during which radio modules may attempt to gain access to an unoccupied channel. In accordance with another exemplary embodiment of the present invention, the multiradio controller may operate using a predicted transmit opportunity timeslot in order to preprocess message packets (e.g., adjust packet sizes) during the contention period. This preprocessing may begin after a threshold has been crossed in the contention period, which may delay the computation involved in preprocessing packets based on the predicted transmit opportunity until a time when there is higher probability that the radio module may actually be granted access to the particular wireless communication medium. If the contention period becomes interrupted after this threshold, the multiradio controller may discard any results and wait until the contention period resumes before attempting to align any reserved time periods.

DESCRIPTION OF DRAWINGS

The invention will be further understood from the following detailed description of various exemplary embodiments, taken in conjunction with appended drawings, in which:

FIG. 5 discloses an operational example wherein interference occurs when utilizing multiple radio modems simultaneously within the same wireless communication device.

FIG. 11 discloses an example of an unscheduled wireless communication medium transmission experiencing problems in accordance with at least one embodiment of the present invention.

FIG. 12A discloses an example of network-level scheduling incorporated into a radio modem in accordance with at least one embodiment of the present invention.

FIG. 13A discloses an example of a system before implementation of the present invention, and the effect of at least one embodiment of the present invention.

DESCRIPTION OF PREFERRED EMBODIMENT

While the present invention has been described in a variety of exemplary embodiments, various changes can be made therein without departing from the spirit and scope of the invention, as described in the appended claims.

I. Wireless Communication Over Different Communication Networks

Figure 1:
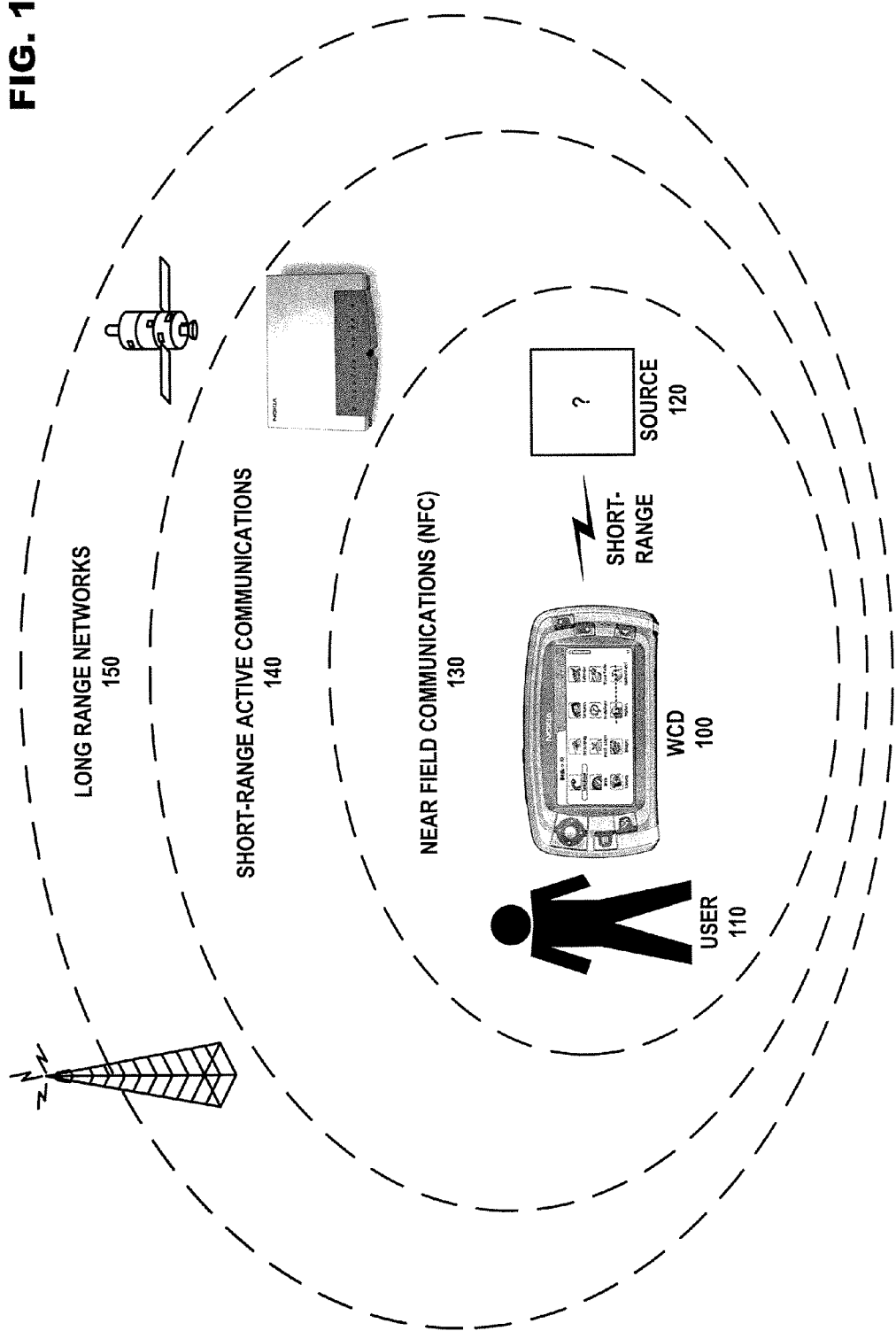
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near field communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
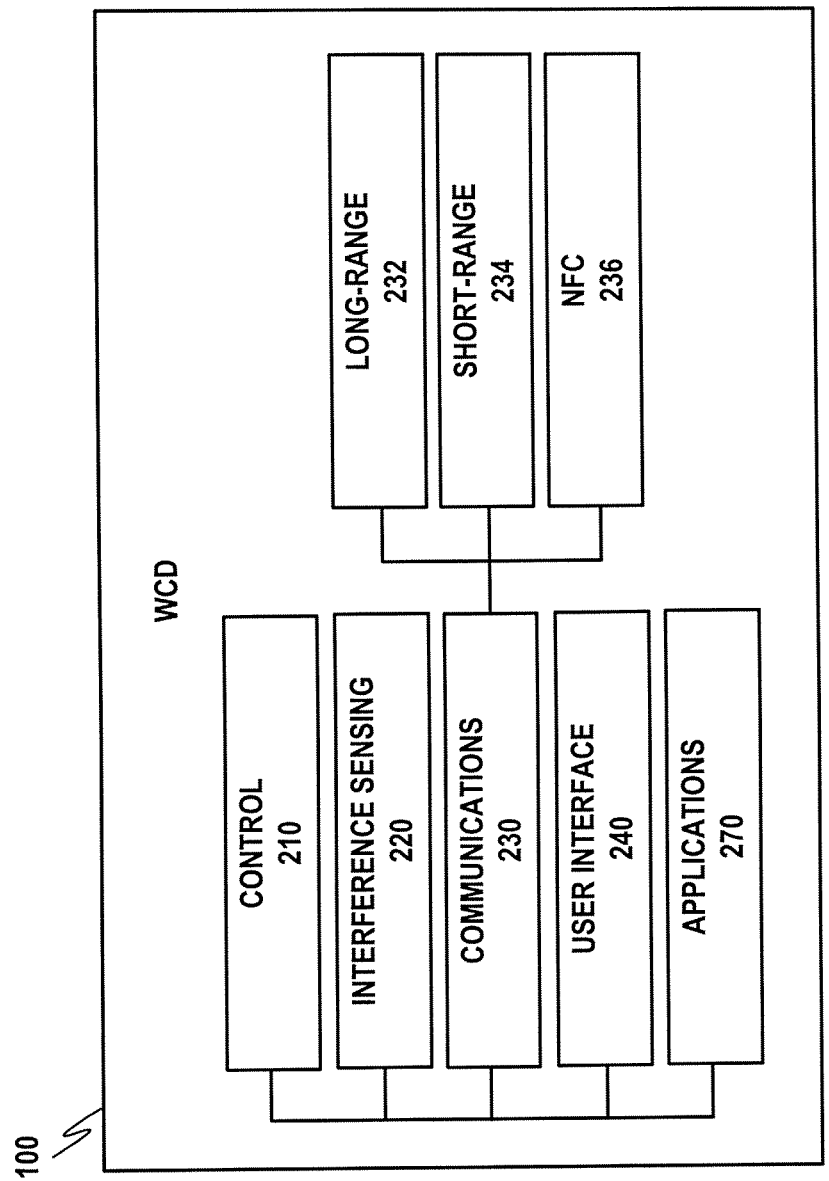
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and NFC module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
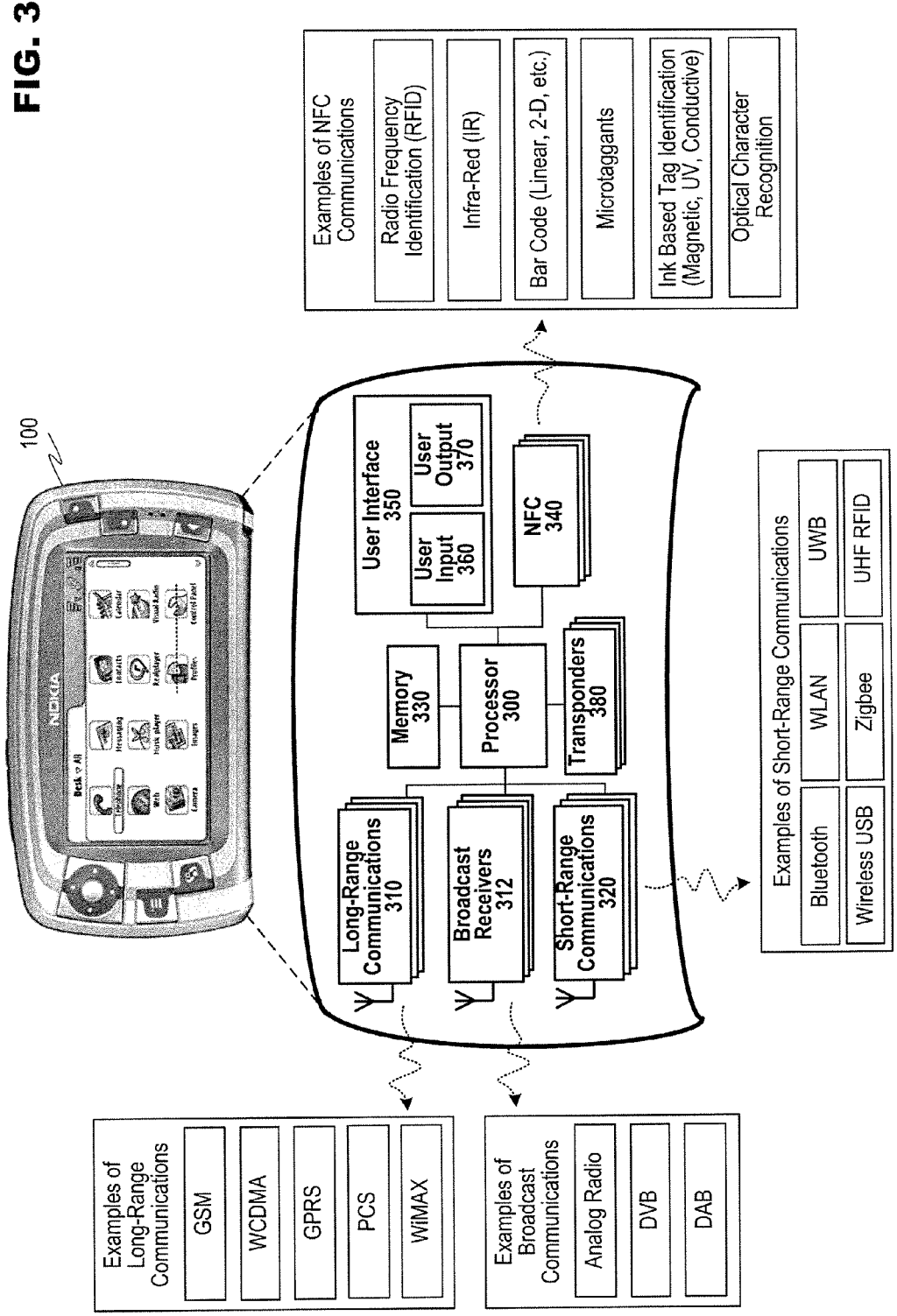
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1 G to 3 G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Near field communication (NFC) 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4:
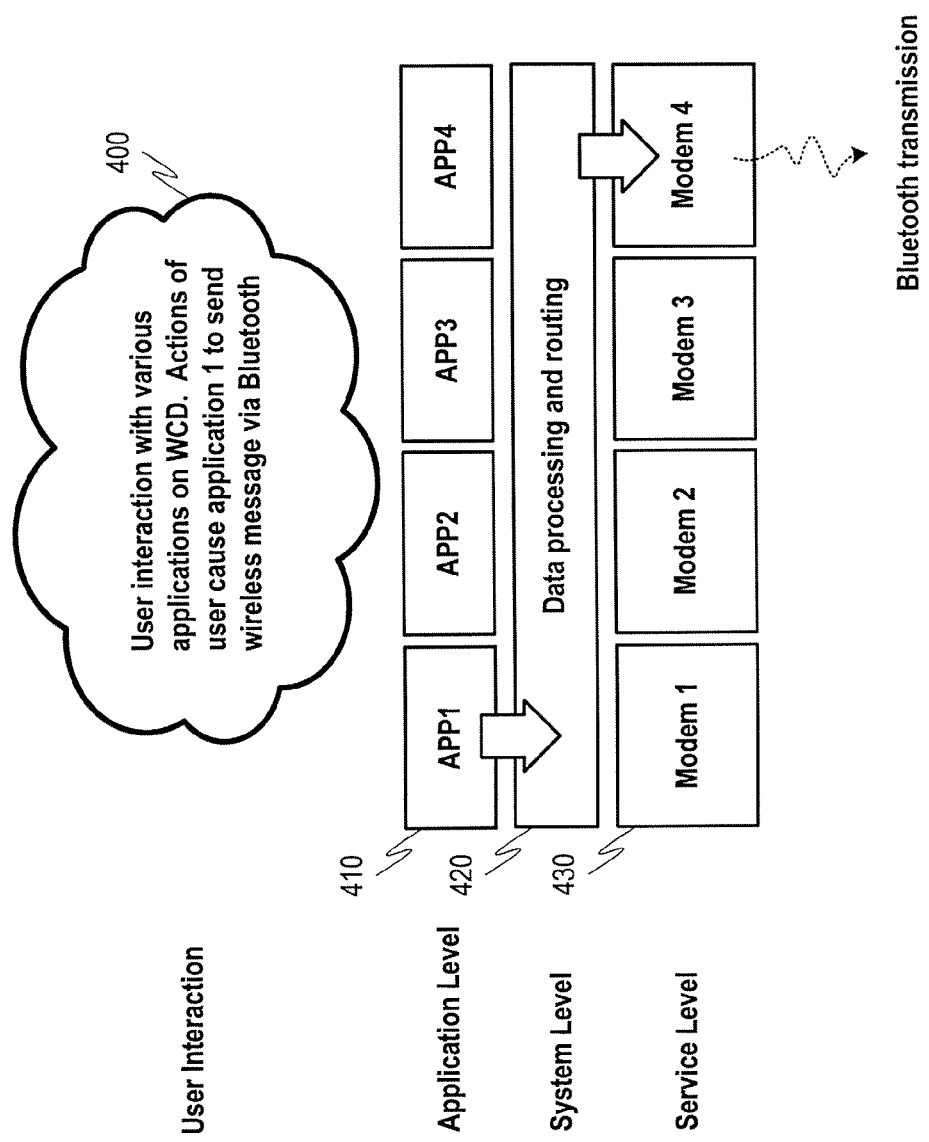
FIG. 4 discloses an exemplary operational description of a wireless communication device utilizing a wireless communication medium in accordance with at least one embodiment of the present invention.

FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. A Wireless Communication Device Including a Multiradio Controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
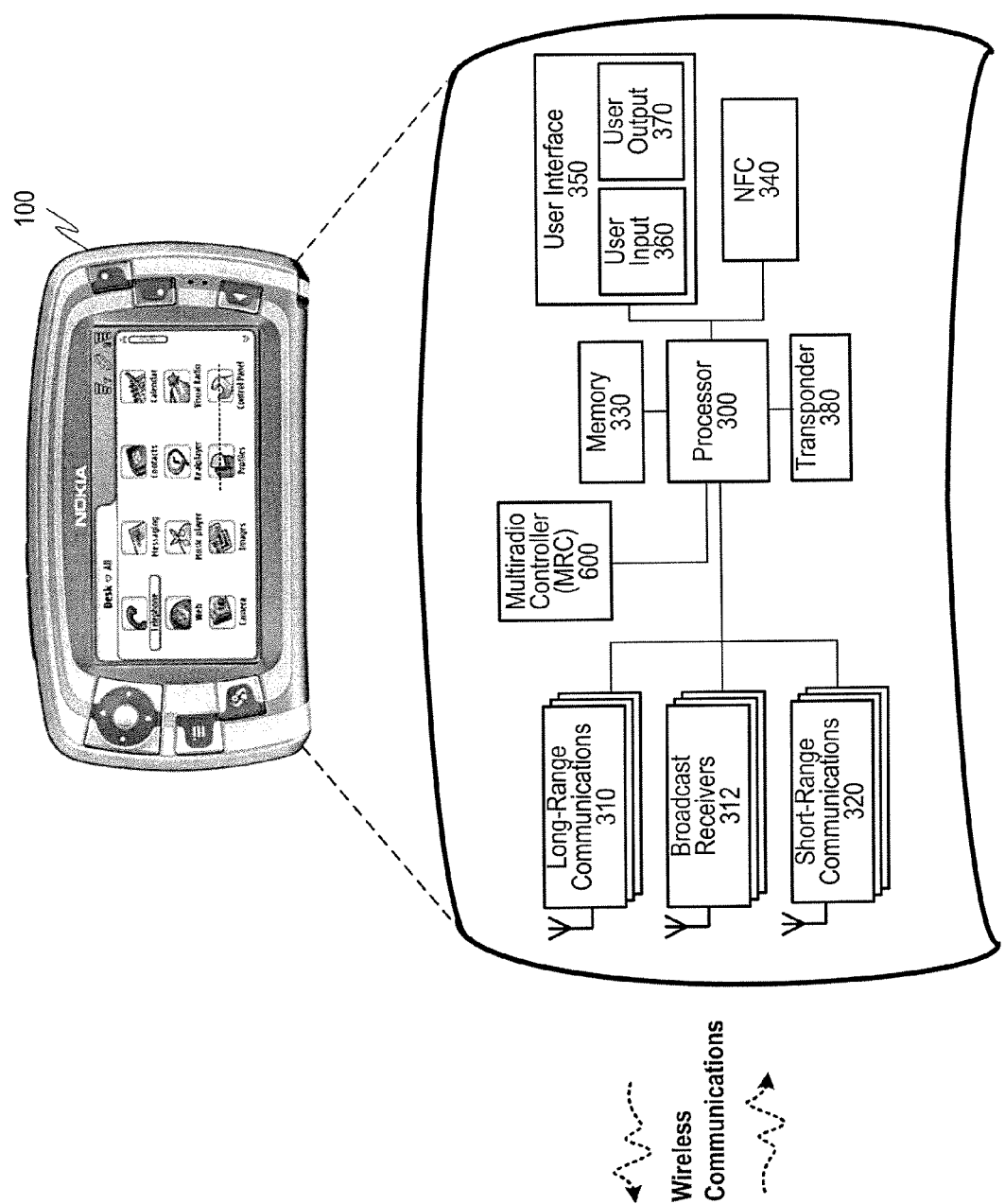
FIG. 6A discloses an exemplary structural description of a wireless communication device including a multiradio controller in accordance with at least one embodiment of the present invention.
Figure 6B:
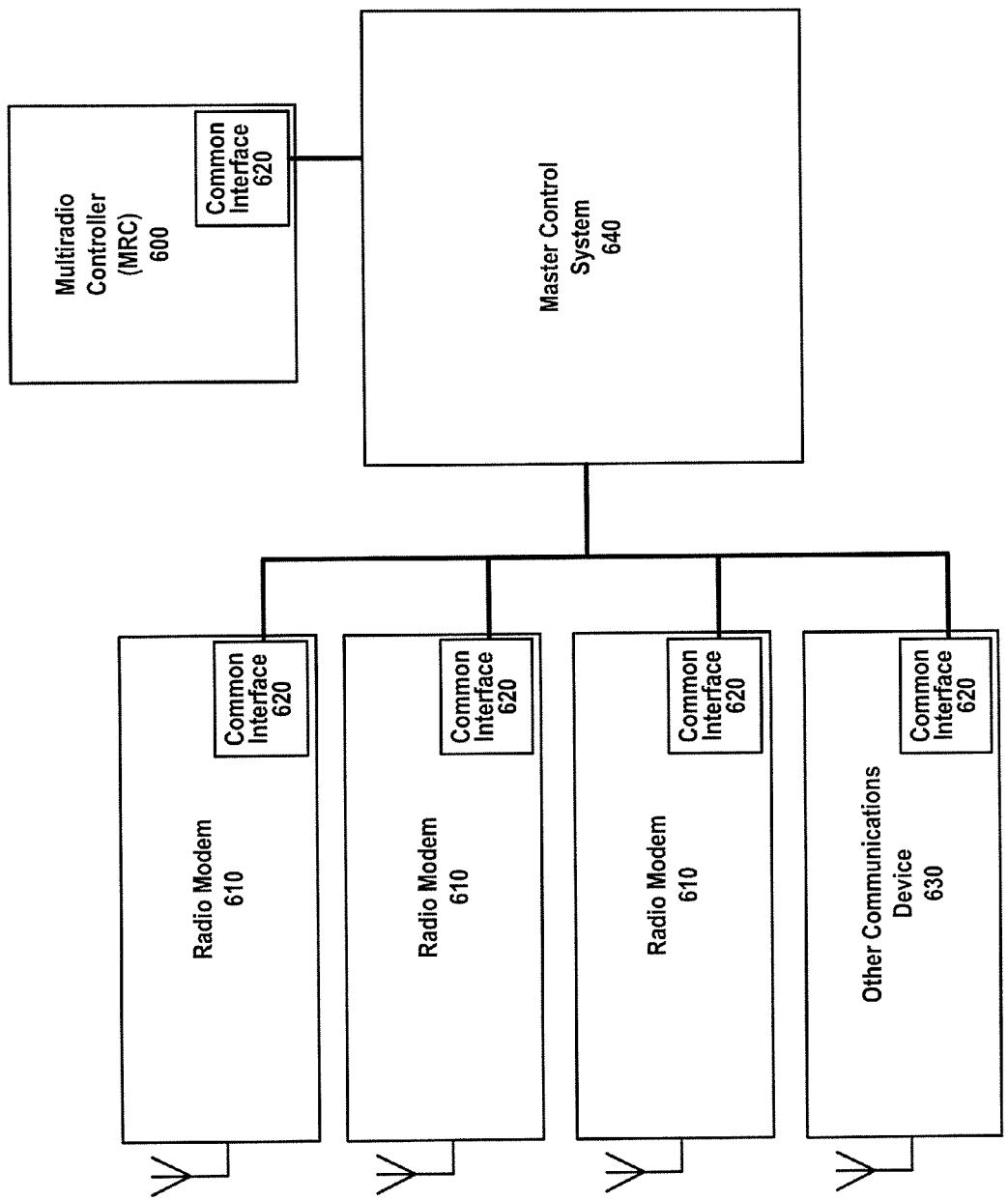
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 may also be referred to as "modules" in this disclosure as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
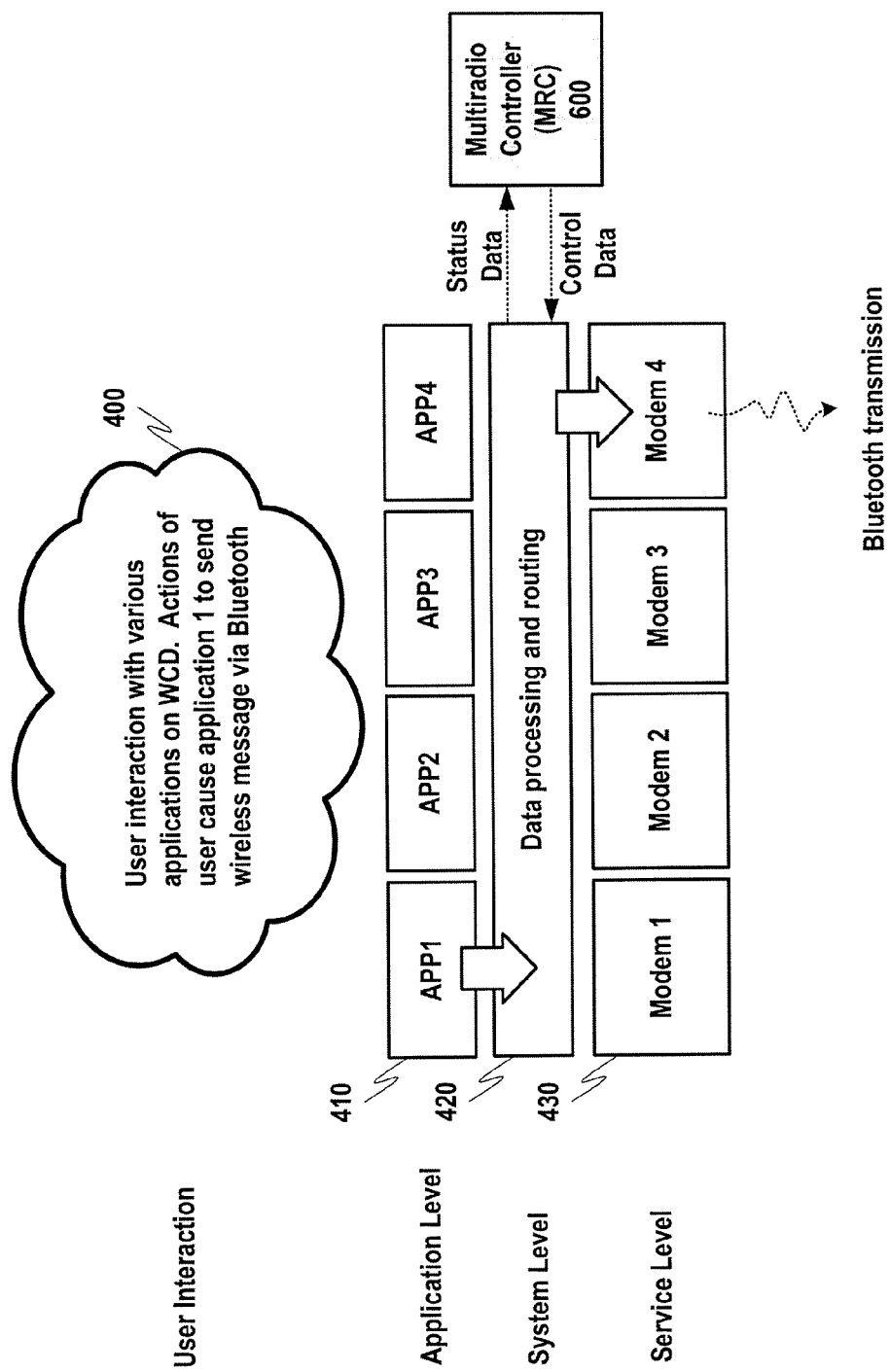
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

Figure 7A:
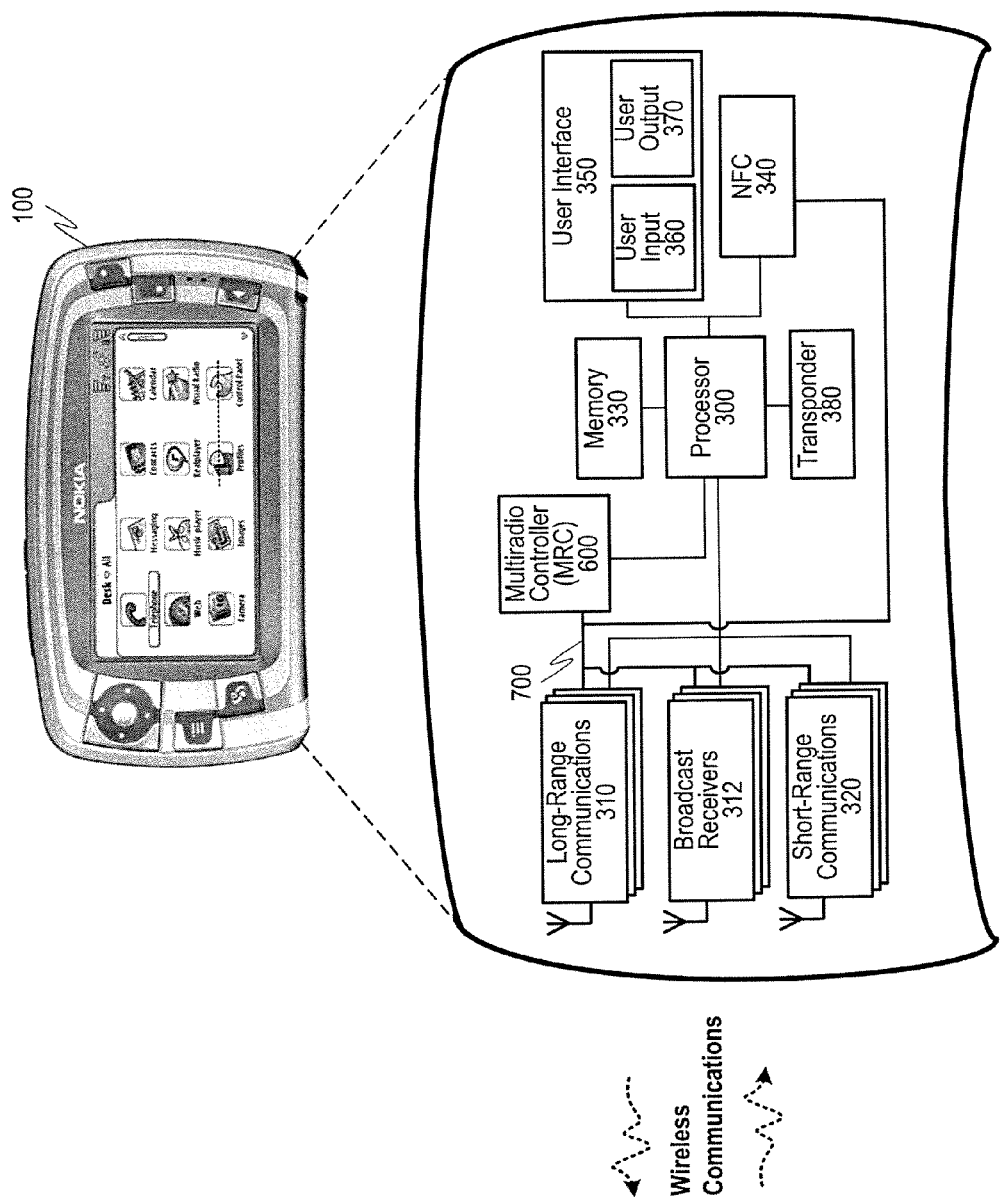
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Figure 7B:
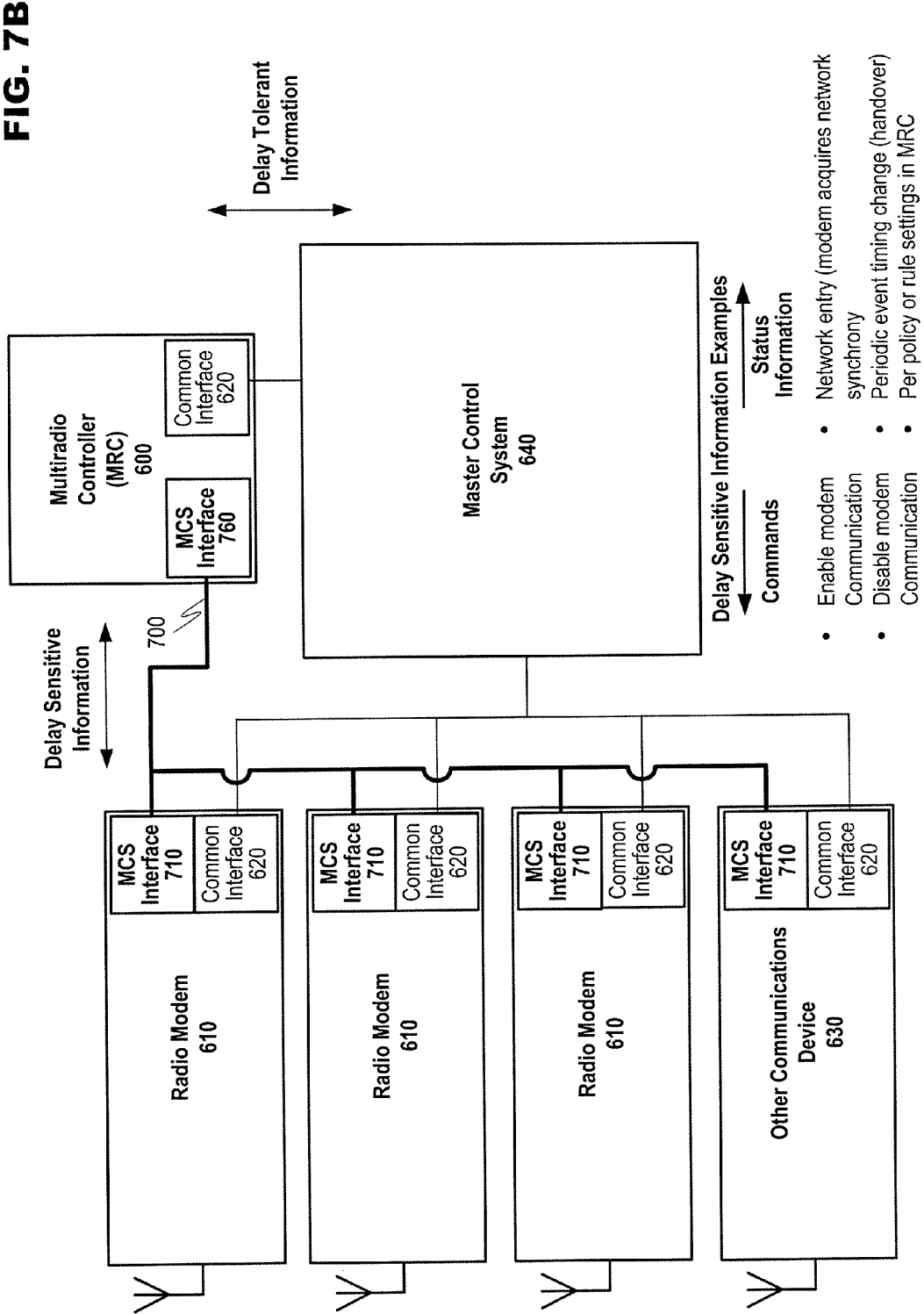
FIG. 7B discloses a more detailed structural diagram of FIG. 7A including the multiradio control system and the radio modems.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

Figure 7C:
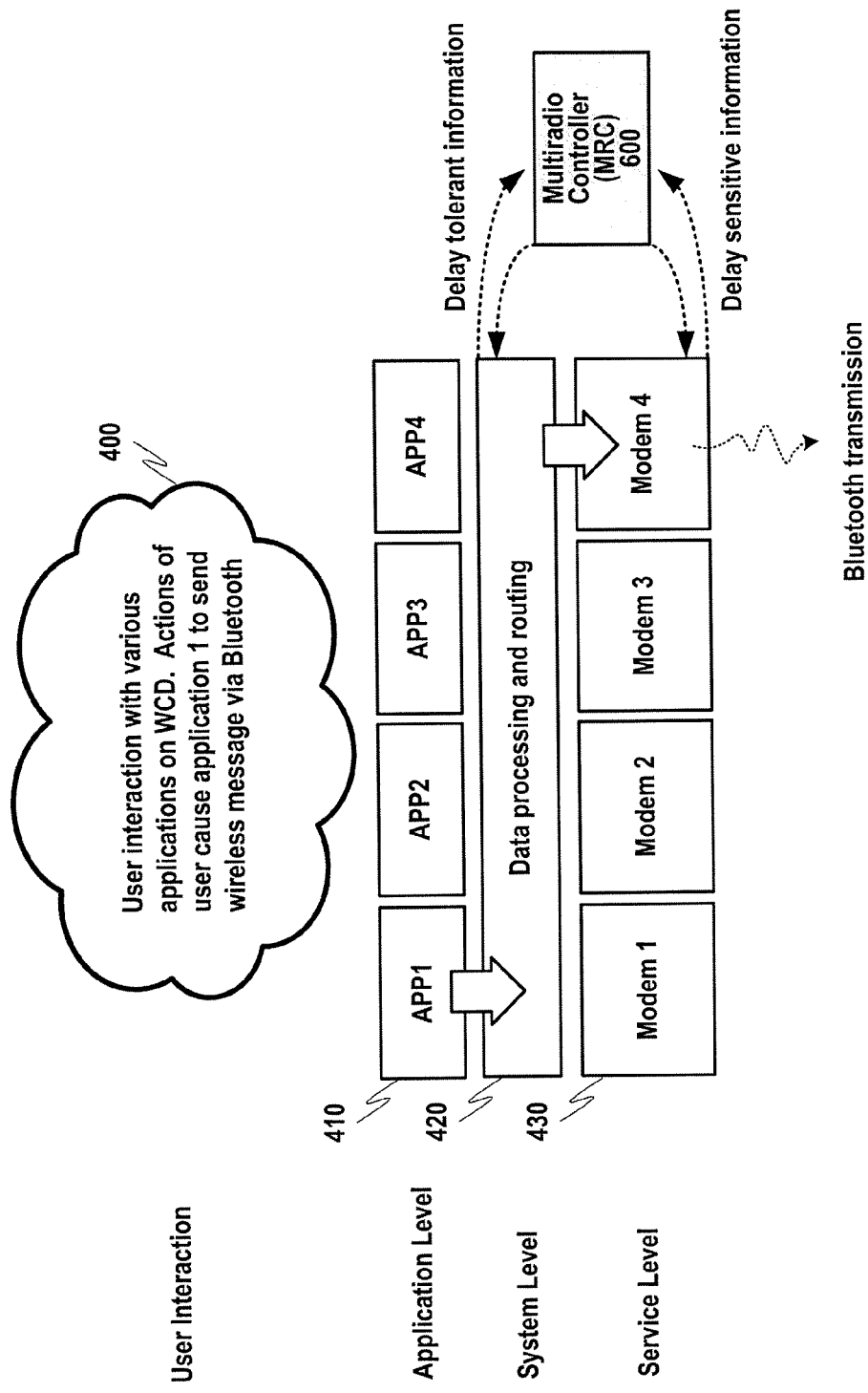
FIG. 7C discloses an exemplary operational description of a wireless communication device including a multiradio control system in accordance with at least one embodiment of the present invention.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System.

Figure 8A:
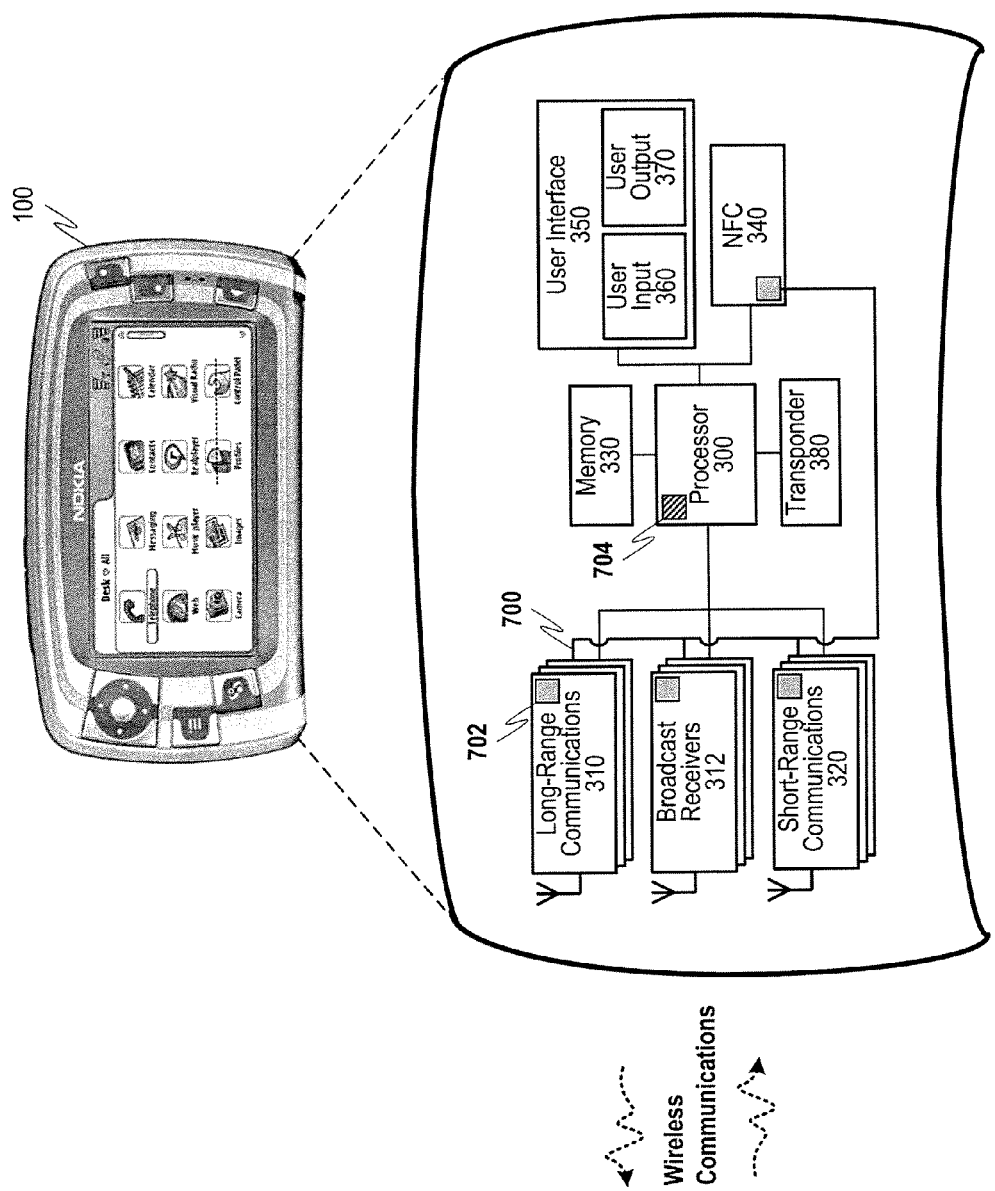
FIG. 8A discloses an exemplary structural description of a wireless communication device including a distributed multiradio control system in accordance with at least one embodiment of the present invention.

FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems (modules) 610, reducing the overall amount of control command traffic in WCD 100.

MCS 700, in this example, may be implemented utilizing a variety of bus structures, including the I²C interface commonly found in portable electronic devices, as well as emerging standards such as SLIMbus that are now under development. I²C is a multi-master bus, wherein multiple devices can be connected to the same bus and each one can act as a master through initiating a data transfer. An I²C bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I²C and I²S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8B:
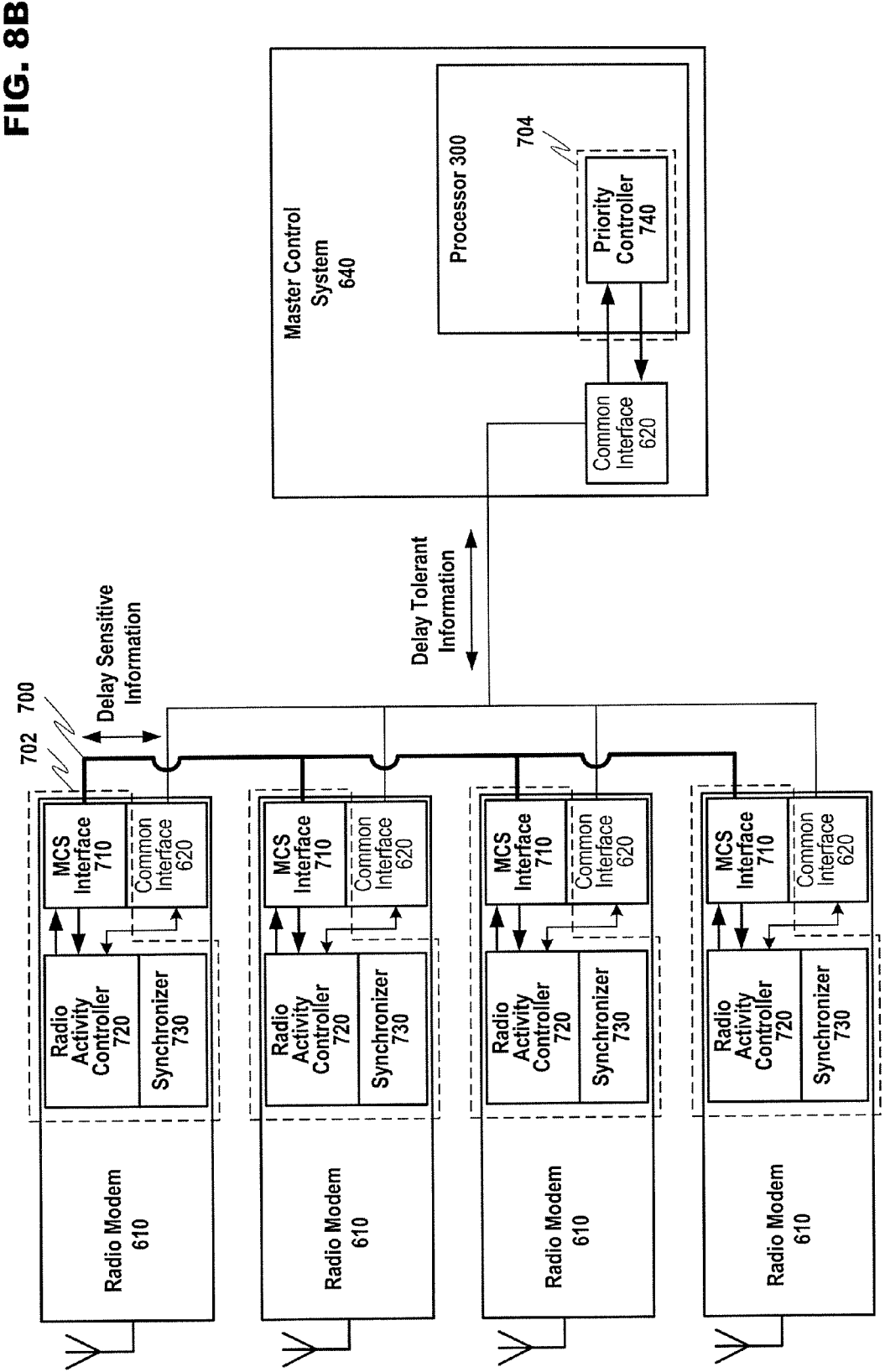
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 (together forming a "module") may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 8C:
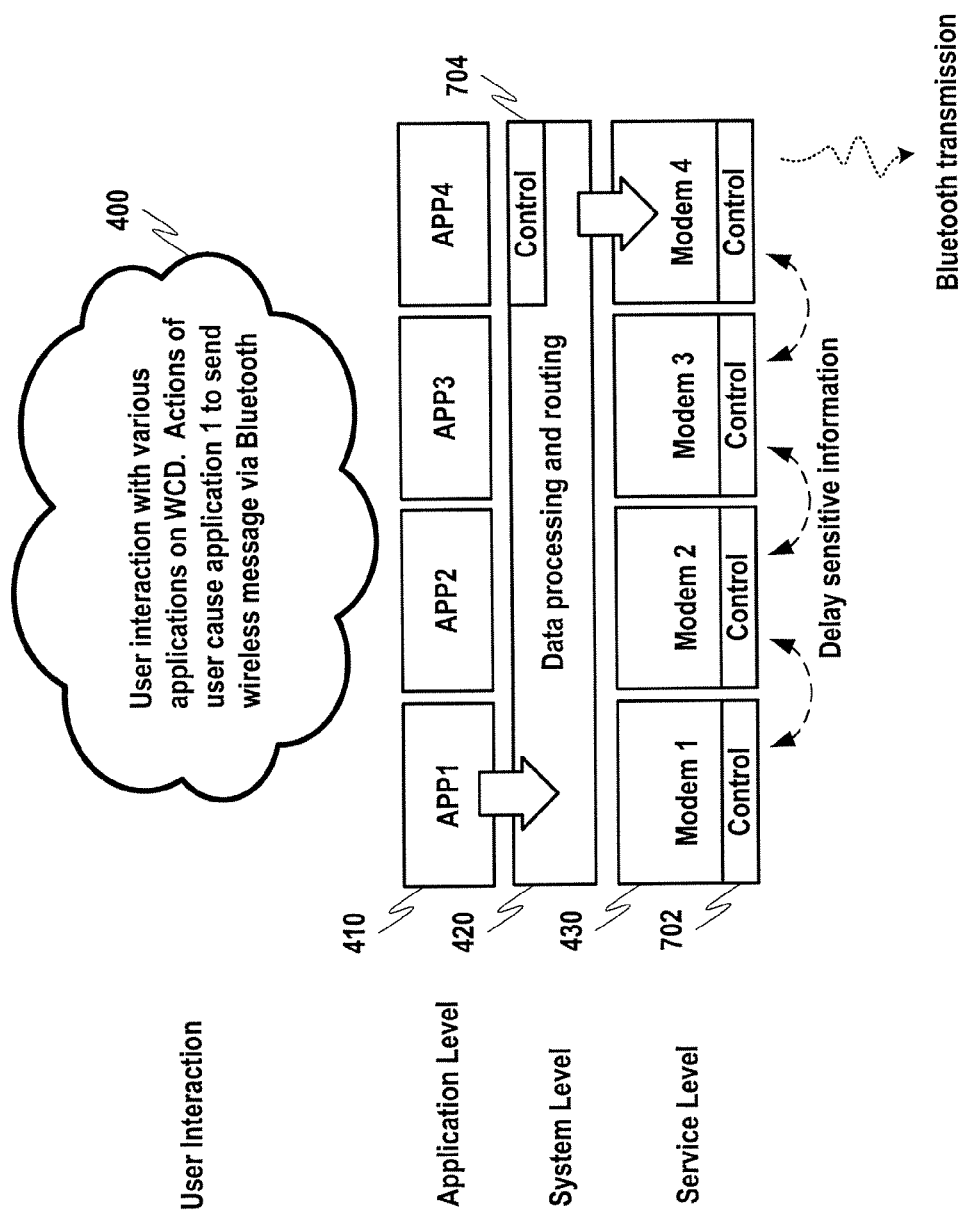
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in Bluetooth™ (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

For predictive wireless communication mediums, the radio modem activity control may be based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 μs, followed by an empty slot after which is the reception slot of 577 two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VII. A wireless Communication Device Including an Alternative Example of a Distributed Multiradio Control System.

Figure 9A:
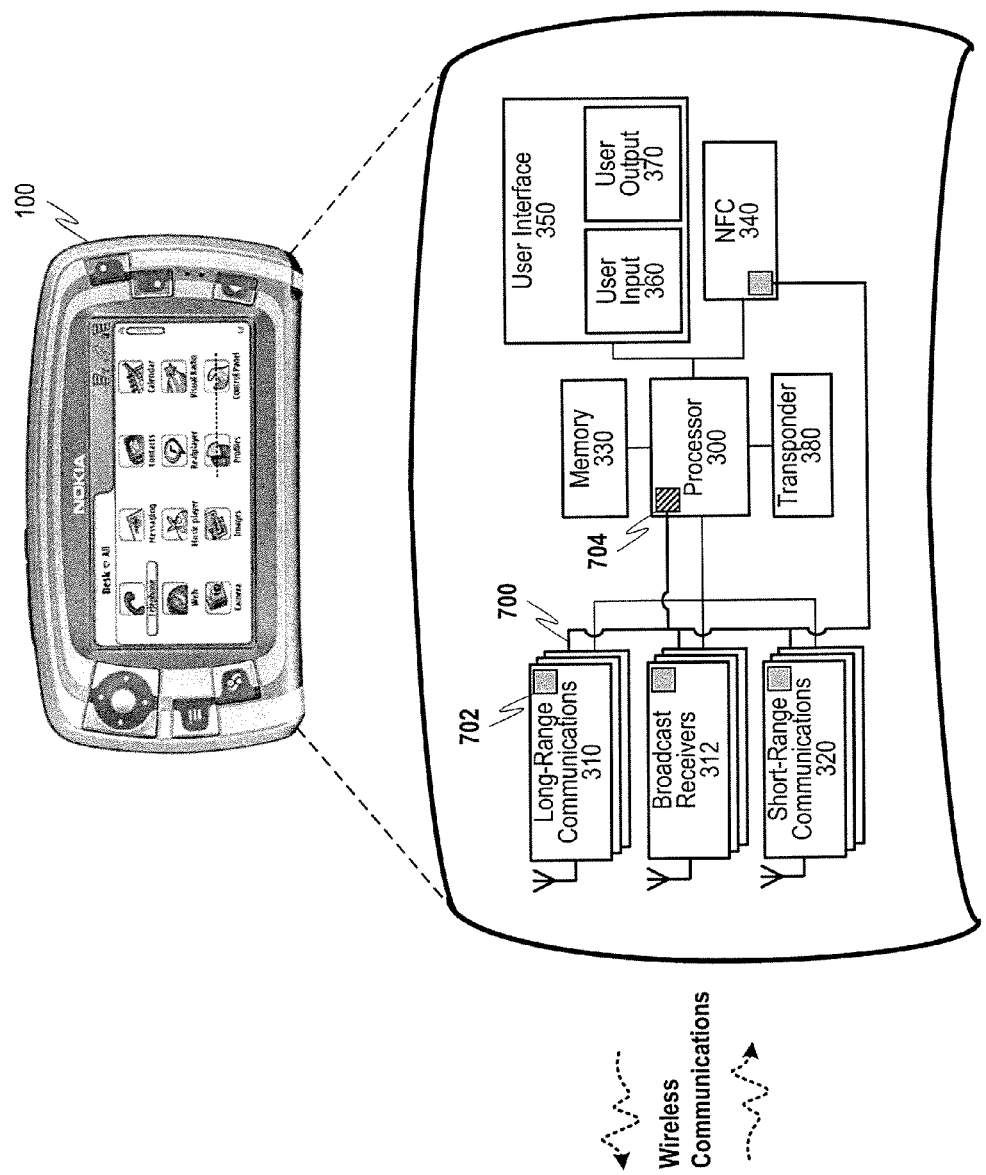
FIG. 9A discloses an exemplary structural description of a wireless communication device including a distributed multiradio control system in accordance with an alternative embodiment of the present invention.
Figure 9B:
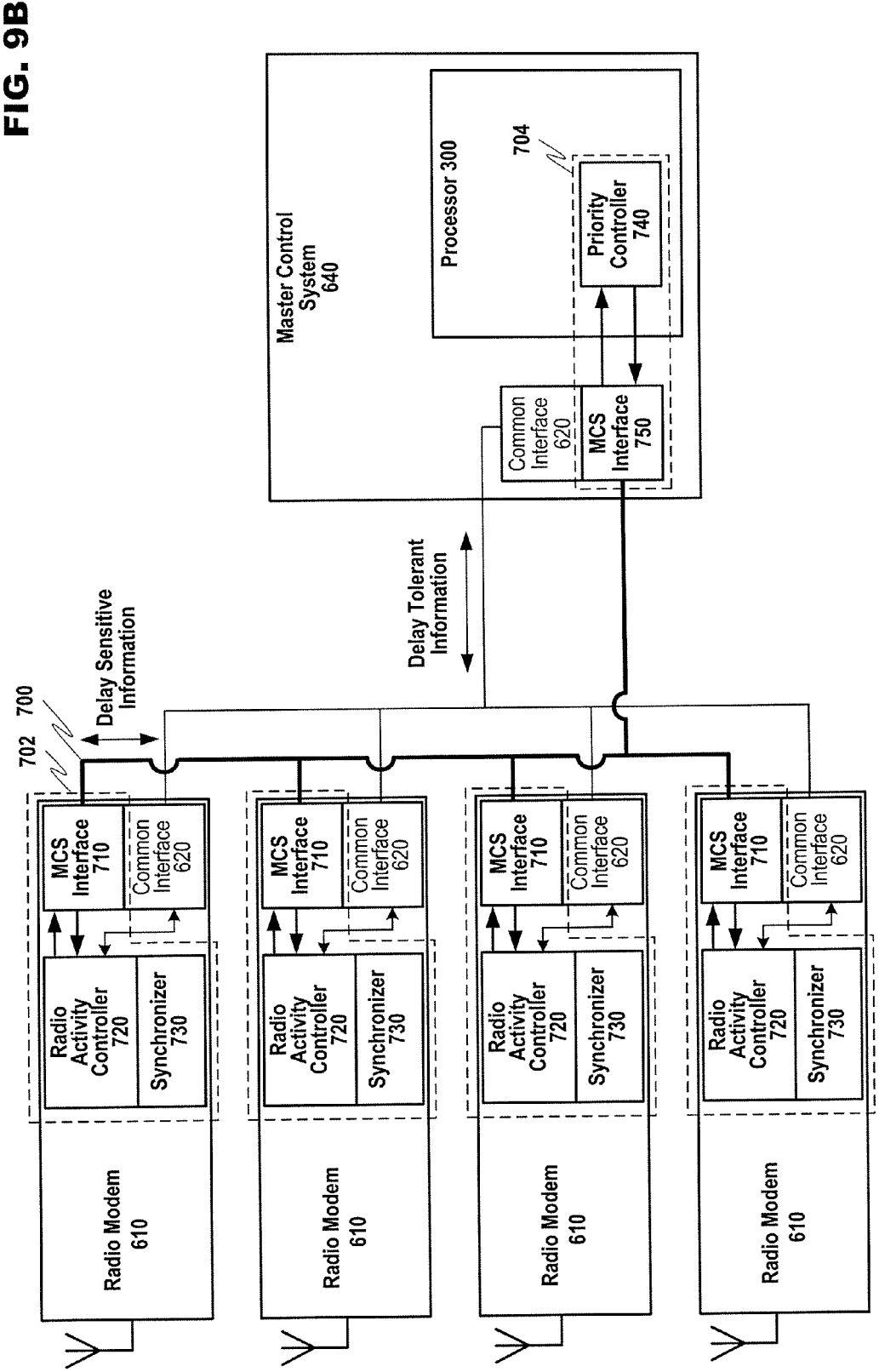
FIG. 9B discloses a more detailed structural diagram of FIG. 9A including the distributed multiradio control system and the radio modems.
Figure 9C:
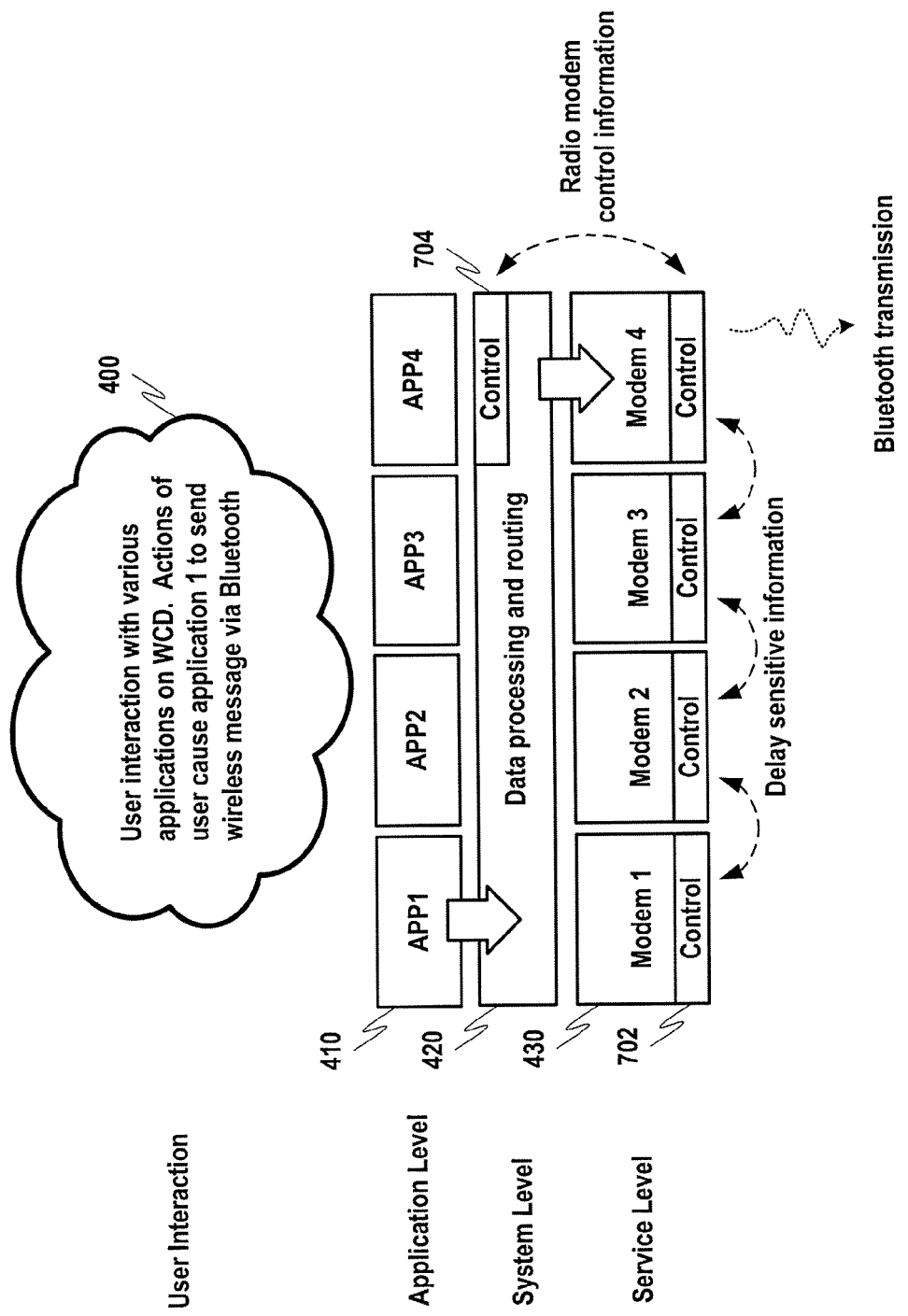
FIG. 9C discloses an exemplary operational description of a wireless communication device including a distributed multiradio control system in accordance with the alternative embodiment of the present invention disclosed in FIG. 9A.

An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

Figure 10:
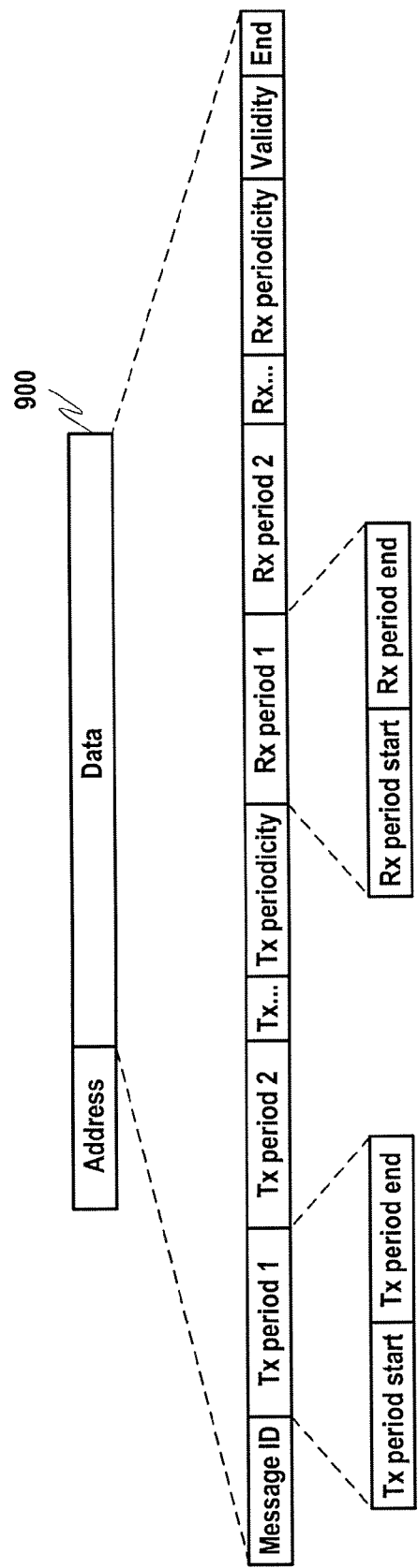
FIG. 10 discloses an exemplary information packet usable with at least one embodiment of the present invention.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices.

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Network-Level Time-Slot Allocation.

It is important to note that while WLAN is frequently used as an example of an unscheduled wireless communication medium in the following disclosure, the present invention is not specifically limited to use only with WLAN, and may be configured to operate with any wireless communication medium having similar operational characteristics.

Figure 12B:
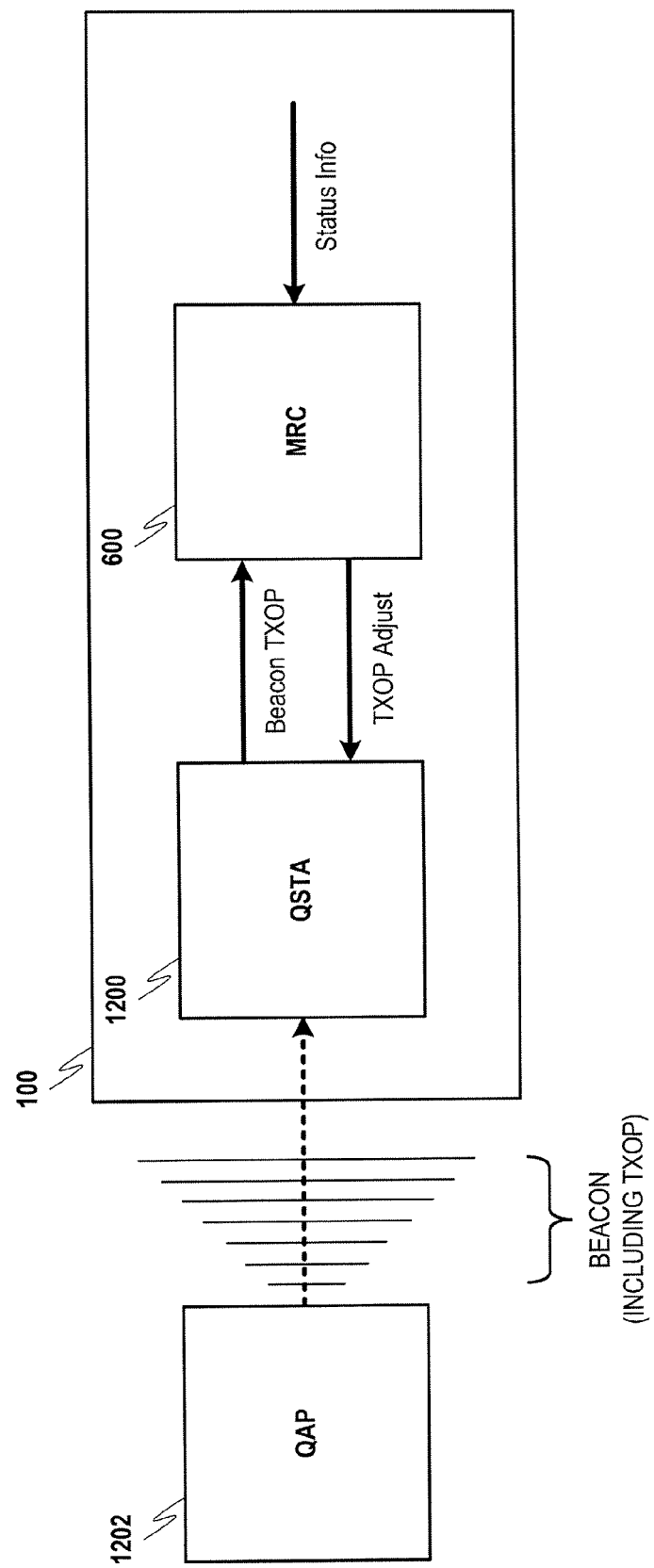
FIG. 12B discloses an exemplary functional diagram of a network-level scheduling in accordance with at least one embodiment of the present invention.

Referring now to FIG. 11, a problematic scenario which at least one embodiment of the present invention seeks to correct is now analyzed. The operation of an unscheduled wireless communication medium is mapped out in FIG. 11. An operational schedule defined by MRC 600 is shown compared to what is actually occurring in the communication medium. The grey areas in the MRC schedule 1100 signify a period when radio modem 610 is permitted to operate in the device level. Time not allocated to radio modem 610 may be reserved for other wireless resources in WCD 100. The WLAN schedule 1102 below the MRC schedule 1100 shows an exemplary wireless transaction that may occur during this time period. Normal traffic can begin after the medium has been idle for at least DIES (distributed coordination function inter-frame space). Then during the contention window stations attempting to transmit select a random back-off counter value, and decrement the counter by one after each back-off slot where the communication channel is determined to be idle, signifying that no traffic has been detected on the channel. Once the counter reaches zero and the medium is still idle, the transmit frame can begin. The DIFS period and contention window are the periods of time when carrier sensing is occurring. When the transmission of the frame has been completed (as is in the case of Frame 1 shown in FIG. 12A) an acknowledgement frame may then be returned from the device that received the original frame 1, and the transaction may be deemed complete in radio modem 610.

However, a problem is seen with respect to the transmission of frame 2. In this example, an extended period of contention and possibly more information contained in the frame has pushed the completion of this frame outside of the allowed air access time. This may be seen, for example, where the NAV for the next queued message includes duration information showing that the transaction will exceed the time allocated to radio modem 610. As a result, the entire frame 2 will not be transmitted to the receiving device, and further, no acknowledgement will be received. This situation may require the retransmission of the frame, which may again fail if the situation in the next available transmission period resembles the scenario for exemplary frame 2. The resources for one or more radio modems 610 may then become depleted due to these retransmissions, possibly impairing the overall communication performance in WCD 100.

FIG. 12A discloses an exemplary configuration in accordance with at least one embodiment of the present invention. A single MRC 600 is shown only for the sake of explanation in this example, as either a unified or distributed MRC architecture may be used. As further seen in FIG. 12A, one of the radio modules 610 now includes a quality of service station (QSTA) 1200. QSTA 1200 may be a software and/or hardware implemented module coupled to, or incorporated within, radio module 610. QSTA 1200 may be coupled to MCS 700 in order to communicate delay-sensitive information. In at least one embodiment of the present invention, a separate interface 1201 dedicated only to communicating information between MRC 600 and QSTA 1202 may also be implemented. In an unscheduled wireless communication medium such as WLAN, special provisions would have to be made in order to guarantee certain Quality of Service (QoS) level. Emerging versions of unscheduled wireless communication mediums, like WLAN, are now providing resources like Enhanced Distributed Channel Access (EDCA) to manage access to the wireless communication medium at the network level. In EDCA, different transactions are assigned priority levels, and each priority level is assigned a Transmit Opportunity (TXOP). A TXOP is a reserved timeslot, defined at the network level, during which a particular station (e.g., radio module 610) is allowed to communicate. Radio module 610 can have as much traffic (e.g., send and receive as many packets as possible) on the unscheduled wireless medium during this time. However, all communication must be completed before the end of the TXOP or a transaction may be cut-off mid-execution, resulting in a message being lost and possibly requiring retransmission. Therefore, if a packet is too large to be sent before a TXOP is complete, then it must be fragmented into smaller frames and distributed between different TXOP timeslots.

TXOP timeslot assignments may be controlled by an access point (AP). An example of an access point including QoS enhancement (QAP) is disclosed in FIG. 12B. QAP 1202 may send transmit signals at beacon intervals to all devices participating in a wireless network via an unscheduled wireless communication medium. The beacon signal may be received by participating devices, such as WCD 100. The TXOP information within the beacon signal may be extracted and interpreted by QSTA 1200, which may further transmit this information to MRC 600 for evaluation. MRC 600, having received status information from various resources within WCD 100, may have created an operational schedule at the device level. MRC 600 may then compare the device-level operational schedule to the network level TXOP information in order to determine whether changes should be made locally to the TXOP in WCD 100. In at least one embodiment, MRC 600 may then send a request to QSTA 1100 to adjust the locally established TXOP to correspond to the operational schedule. Alternatively, a new local TXOP setting may be determined in MRC 600, which then instructs QSTA 1100 to change the local TXOP to the new setting.

More specifically, the TXOP may be initially established by QAP 1202 via beacon signals. However, after this information is received by WCD 100, it becomes a communication setting governing the operation of radio module 610. Therefore, the TXOP value set in WCD 100 may be altered in order to change the behavior a radio module 610 supporting an unscheduled wireless communication medium. In adjusting the TXOP, the value may never be made larger than the value initially set by QAP 1202 because the initial TXOP value is the maximum amount of time in which radio module 610 is permitted to operate. However, the TXOP value in WCD 100 may be reduced in order to coincide with the operational schedule set by MRC 600, as will be explained with respect to FIG. 13A.

FIG. 13A discloses exemplary activity diagrams in accordance with at least one embodiment of the present invention. Operational schedule 1300 and QSTA operation 1302 correspond to a scenario without the control aspects introduced in the present invention. Operational schedule 1300 includes an access window during which a particular wireless communication medium is permitted to operate as determined at the device level. Further QSTA operation 1302 may use information received from QAP 1202 to determine a TXOP that exceeds the access window defined in 1300. As disclosed in the activity progression of 1302, the TXOP may begin after the contention period ends. Protocol data units (PDU), for example data packets, may be sent during the TXOP followed by acknowledgements from the receiving device. However, in this example the device-level access window cuts off access to resources in WCD 100 for the particular wireless communication medium and/or radio module before the network-level TXOP. As a result, the transaction is not completed (as shown at 1308) and even if the PDUs were sent successfully, the lack of a complete acknowledgement will render the transaction unsuccessful, possibly requiring retransmission.

At least one embodiment of the present invention will now be discussed with respect to operational schedule 1304 and QSTA operation 1306. In the disclosed example, again operational schedule 1304 may include at least one access window defining (at the device level) a period during which a particular wireless communication medium may be active. QSTA operation 1306 may initially be defined by QAP 1202. However, in this example, MRC may evaluate the TXOP duration set by QAP 1202 in view of the operational schedule, and may alter the local setting of the TXOP in WCD 100 (e.g., in QSTA 1200) so as to align the local and network level allowed timeslots. For example, the TXOP in QSTA operation 1306 is shortened, as shown at 1312, so that it may terminate at the same time as the access window in operational schedule 1304. In this way, radio module 610 may have means to complete communication by the end of the MRC-defined device-level operational schedule access window, thereby allowing communication to terminate in a successful transaction. In order to avoid exceeding the time limit set forth by the access window of operational schedule 1304, the sending of a PDU during the access window may have to be cancelled, or alternatively further segmented and divided between multiple access windows as shown at 1310.

X. TXOP Prediction Threshold.

Adjusting the local TXOP setting, as disclosed above, may be effective for reducing communication errors in that it forces a radio module 610 to reformulate PDU size (e.g., via fragmentation) in order to fit a TXOP that has been aligned with the operational schedule. However, this reformulation may take time and device resources to complete. In accordance with at least one embodiment of the present invention, it may be beneficial to initiate the PDU reformulation process before the required contention period is conducted by QSTA 1202. This may be done using a prediction based on, for example, previously received TXOP information, timeslots that occur in the device-level operational schedule, etc. Using this prediction, preprocessing may begin during the contention period that occurs before a radio module 610 gains access to a channel. In view of this "preprocessing," MRC 600 may be able to adjust the local TXOP setting and allow the radio module 610 to perform necessary preparations, such as, for example, perform in PDU reformulation before the start of the communication, which will happen immediately after the contention period is conducted.

As set forth above, radio modules attempting to access unscheduled wireless communication mediums may participate in a contention period during which channel availability is verified. Since there is no assurance that the carrier will be available, it is foreseeable that a radio module 610 may determine that the channel is busy, which results in an interruption in the contention period. If the contention period becomes interrupted, the resources expended by MRC 600 in coordinating the PDU preprocessing may be wasted. More specifically, the access timeslots established by MRC 600 in an operational schedule and the TXOP window prediction may not be the same after the next successful contention period. Therefore, in order to conserve resources within WCD 100, an early TXOP prediction threshold may be incorporated into the operation of MRC 600, in accordance with at least one embodiment of the present invention, in order to delay PDU preprocessing. This threshold may be set to indicate an amount of time (e.g., a number of microseconds). After the normal contention period has proceeded to a point where a smaller amount of time remains of the expected contention period, MRC 600 and/or radio module 610 may began to preprocess pending message packets in view of the predicted TXOP with the assumption that the remainder of the contention period will be uninterrupted. As a result, MRC 600 and/or radio module 610 may be more prepared to proceed with communication when the actual TXOP is received, preserving resources and possibly enhancing communication performance.

Figure 13B:
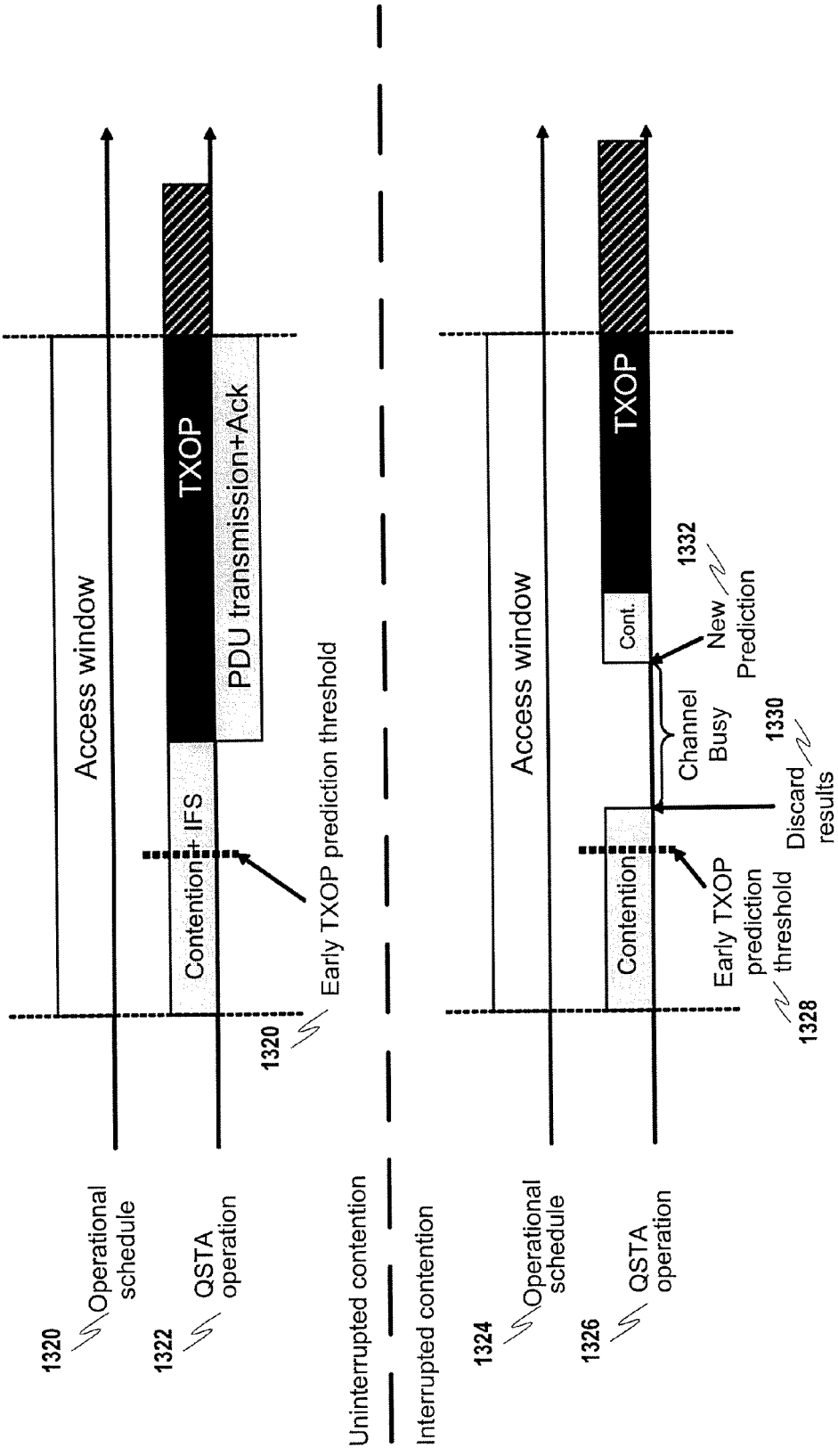
FIG. 13B discloses another example of a system before implementation of the present invention, and the effect of a different configuration in accordance with at least one embodiment of the present invention.

An example of the above functionality in accordance with at least one embodiment of the present invention is now explained with reference to FIG. 13B. The activity flow depicted in FIG. 13B again discloses an exemplary operational schedule 1320 and QSTA operation 1322. Further, an early TXOP prediction threshold is shown at 1320. This threshold may set forth a time during the contention period where the probability that the contention period will be completed without interruption justifies proceeding with PDU preprocessing. In the exemplary QSTA operation 1322, there is no interruption in the contention period, and therefore, a TXOP prediction may be used to begin resizing packets. Packet preprocessing may expedite communication when the actual TXOP is received in that MRC 600 may immediately resize the TXOP and begin transmission of pending messages.

Another example including an interrupted contention period is shown with respect to operational schedule 1324 and QSTA operation 1326. In this example, the operational schedule again sets forth at least one access window during which a particular wireless communication medium is permitted to operate. In QSTA operation 1326, the contention period extends past the early TXOP threshold prediction 1328, but then becomes interrupted at 1330. PDU preprocessing may stop, in accordance with at least one embodiment of the present invention, and any preprocessing that has taken place may be discarded as shown at 1330. A new TXOP prediction may be formulated when the contention period resumes at 1332, and PDU preprocessing may begin again in view of this updated prediction. Eventually, the contention period ends, and actual data transmission for the radio modem may begin, wherein the local TXOP settings may be adjusted by MRC 600 to align with the device-level operational schedule, and PDU (e.g., packet) transmission may quickly commence.

Figure 14:
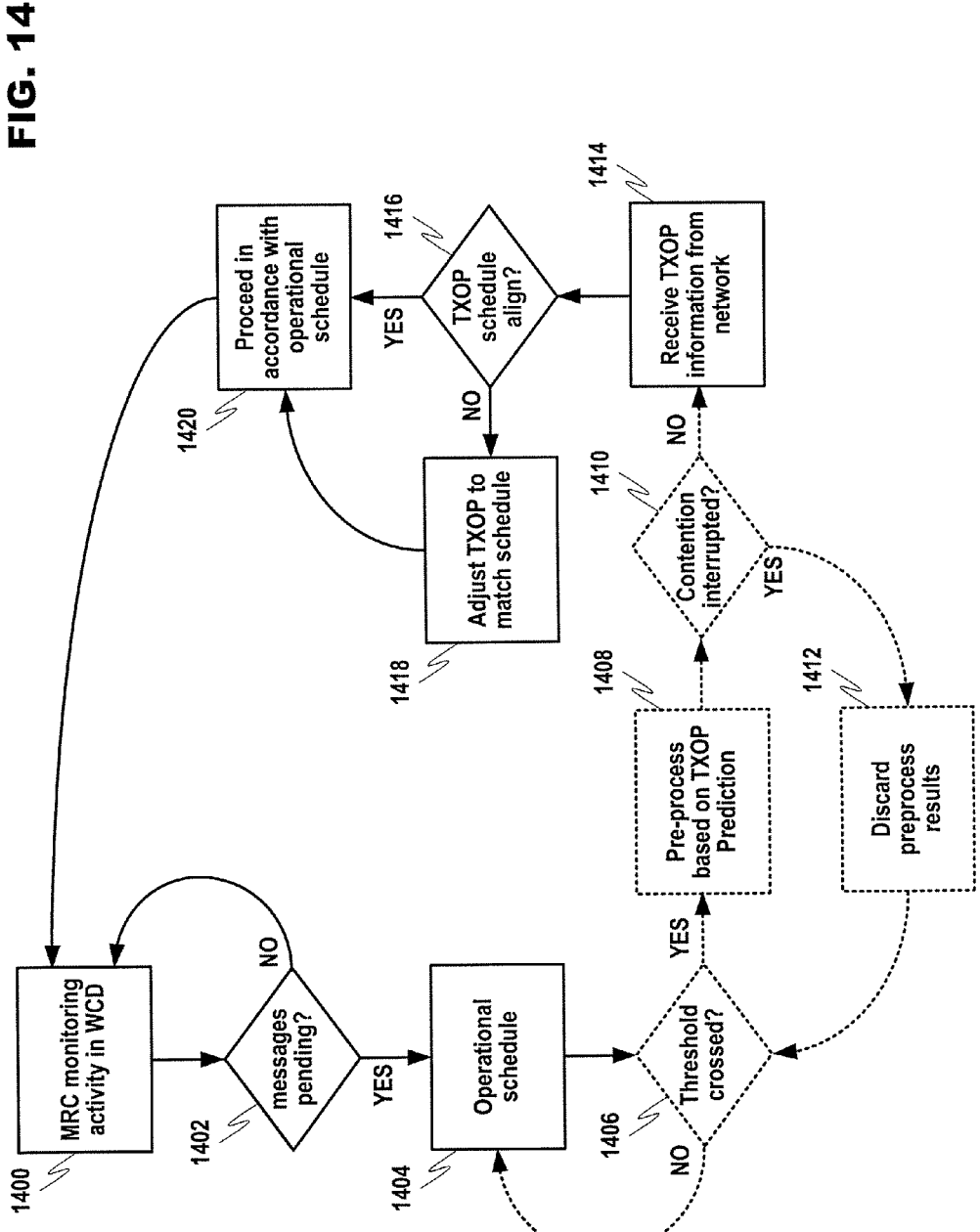
FIG. 14 discloses an exemplary flowchart for a process of managing a plurality of wireless communication mediums in accordance with at least one embodiment of the present invention.

A process in accordance with at least one embodiment of the present invention is now disclosed in FIG. 14. In step 1400 MRC 600 may monitor activity in WCD 100. This monitoring may include receiving activity or status information for wireless communication mediums and/or radio modules in WCD 100. Wireless communication medium activity may include a number of messages pending, an age of messages pending, a priority of messages pending, a source application for the messages, etc. Radio module 610 information may include radio module condition (active, waiting, disabled, errors, etc.). MRC 600 may continue to monitor activity in WCD 100 at 1402 until messages are pending. Then in step 1404, MRC 600 may utilize the above activity information to formulate an operational schedule. The operational schedule may assign reserved timeslots during which each wireless communication medium with pending messages is allowed to communication.

In at least one embodiment of the present invention, steps 1406 to 1410 may be added in order to support PDU preprocessing as disclosed above. In step 1406, a contention period may be initiated, during which MRC 600 may monitor to determine if the early TXOP threshold prediction has been exceeded. If this threshold is not exceeded, MRC 600 may delay preprocessing in view of updates to the operational schedule and/or the TXOP prediction. Step 1408 may begin PDU preprocessing once the threshold is crossed. During this time pending packets may be resized (e.g., through fragmentation) in view of the TXOP prediction. If during this process the contention period is interrupted (step 1410) then the process may proceed to step 1412, wherein any preprocessing information may be discarded. The process would then resume at 1406 where operational schedule data and/or the TXOP prediction may be updated. Alternatively, if the contention period is completed in step 1410 without interruption, then in step 1414 actual TXOP information may be received into QSTA 1200 from QAP 1202. This information may be shared with MRC 600, which may then evaluate the timeslots scheduled at the network level, as defined by the TXOP, in view of the timeslots scheduled at the device level (e.g., operational schedule) which are higher priority.

MRC 600 may determine that one or more network-level access windows must be adjusted in order to better align with the device-level operational schedule. If MRC determines that a TXOP must be adjusted to match the operational schedule in step 1416, then in step 1418 MRC 600 may request this change. For example, MRC 600 may request that a TXOP setting be reduced so that the termination of the TXOP aligns with an access window termination in the operation schedule. Alternatively, MRC 600 may determine the new local TXOP setting and instruct that it be changed in QSTA 1200. The request (or instruction) to alter a local TXOP setting may, in at least one embodiment of the present invention, be conveyed from MRC 600 to QSTA 1200 via MCS 700 in order to avoid any delay that might be experienced using the common interface in WCD 100. Alternatively, a separate interface dedicated only to communication between QSTA 1200 and MRC 600 may be implemented (e.g., 1201 in FIG. 12A). QSTA 1200 may the quickly adjust the local TXOP setting in accordance with the information provided by from MRC 600. Whether or not adjustment is required to the TXOP, the process will eventually proceed to step 1420 where communication may proceed in accordance with the operational schedule formulated by MRC 600 until the current operational schedule ends and the process begins again at 1400.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   receiving device information regarding a plurality of wireless communication mediums being supported by one or more radio modules in a wireless communication device;
   formulating a local operational schedule for the one or more radio modules to operate on the plurality of wireless communication mediums based on the device information, the local operational schedule comprising one or more time periods allowed for communication by the one or more radio modules on each of the plurality of supported wireless communication mediums;
   receiving, from a radio module, network information regarding an associated wireless communication medium, the network information being used to determine allowed activity periods for communicating in the associated wireless communication medium;
   comparing the local operational schedule for the associated wireless communication medium with the allowed activity periods for communicating in the associated wireless communication medium; and
   instructing the radio module to adjust a duration of the allowed activity periods to correspond with the local operational schedule if the duration of the allowed activity periods exceeds the one or more time periods allowed for communication in the local operational schedule.

2. The method of claim 1, wherein the device information includes at least one of pending message information for each wireless communication medium and radio module status information.

3. The method of claim 1, wherein formulating a local operational schedule includes allocating periods of time during which a wireless communication medium is allowed to be active.

4. The method of claim 3, wherein the activity periods are determined from wireless beacon signals received from a network controller that establish a transmit opportunity during which the associated wireless communication medium is allowed to be active.

5. The method of claim 1, further comprising preprocessing information in view of a predicted allowed activity period, wherein the preprocessing does not initiate until a threshold is exceeded during a contention period for the associated wireless medium.

6. The method of claim 5, further comprising discarding the preprocessed information, discarding the adjusted allowed activity period, and restarting comparison of the local operational schedule with the allowed activity periods and adjusting of the allowed activity period if the contention period for the associated wireless communication medium is interrupted.

7. The method of claim 1, wherein the device information and the network information are received, and the instructing the radio module to adjust a duration of the allowed activity periods occurs, via a dedicated interface for communicating delay-sensitive information.

8. A computer program product comprising a non-transitory computer usable medium having computer readable program code stored in said medium, comprising:
   code configured to receive device information regarding a plurality of wireless communication mediums being supported by one or more radio modules in a wireless communication device;
   code configured to formulate a local operational schedule for the one or more radio modules to operate on the plurality of wireless communication mediums based on the device information, the local operational schedule comprising one or more time periods allowed for communication by the one or more radio modules on each of the plurality of supported wireless communication mediums;
   code configured to receive, from a radio module, network information regarding an associated wireless communication medium, the network information being used to determine allowed activity periods for communicating in the associated wireless communication medium;
   code configured to compare the local operational schedule for the associated wireless communication medium with the allowed activity periods for communicating in the at least one wireless communication medium; and
   code configured to instruct the radio module to adjust a duration of the allowed activity periods to correspond with the local operational schedule if the duration of the allowed activity periods exceeds the one or more time periods allowed for communication in the local operational schedule.

9. The computer program product of claim 8, wherein the device information includes at least one of pending message information for each wireless communication medium and radio module status information.

10. The computer program product of claim 8, wherein formulating a local operational schedule includes allocating periods of time during which a wireless communication medium is allowed to be active.

11. The computer program product of claim 10, wherein the activity periods are determined from wireless beacon signals received from a network controller that establish a transmit opportunity during which the associated wireless communication medium is allowed to be active.

12. The computer program product of claim 8, further comprising preprocessing information in view of a predicted allowed activity period, wherein the preprocessing does not initiate until a threshold is exceeded during a contention period for the associated wireless medium.

13. The computer program product of claim 12, further comprising discarding the preprocessed information, discarding the adjusted allowed activity period, and restarting comparison of the local operational schedule with the allowed activity periods and adjusting of the allowed activity period if the contention period for the associated wireless communication medium is interrupted.

14. A device, comprising:
   at least one radio module; and
   a controller coupled to the at least one radio module, the controller being configured to:
      receive device information regarding a plurality of wireless communication mediums being supported by one or more radio modules in a wireless communication device;
      formulate a local operational schedule for the one or more radio modules to operate on the plurality of wireless communication mediums based on the device information, the local operational schedule comprising one or more time periods allowed for communication by the one or more radio modules on each of the plurality of supported wireless communication mediums;
      receive, from a radio module, network information regarding an associated wireless communication medium, the network information being used to determine allowed activity periods for communicating in the associated wireless communication medium;
      compare the local operational schedule for the associated wireless communication medium with the allowed activity periods for communicating in the associated wireless communication medium; and
      instruct the radio module to adjust a duration of the allowed activity periods in the wireless communication device to correspond with the local operational schedule if the duration of the allowed activity periods exceeds the one or more time periods allowed for communication in the local operational schedule.

15. The device of claim 14, wherein the device information includes at least one of pending message information for each wireless communication medium and radio module status information.

16. The device of claim 15, wherein the duration of the allowed activity periods are reduced within the wireless communication device so as not to exceed the duration of corresponding time periods in the local operational schedule.

17. The device of claim 14, wherein formulating a local operational schedule includes allocating periods of time during which a wireless communication medium is allowed to be active.

18. The device of claim 17, wherein the activity periods are determined from wireless beacon signals received from a network controller that establish a transmit opportunity during which the associated wireless communication medium is allowed to be active.

19. The device of claim 14, further comprising a multiradio controller in the device configured to compare the allowed activity periods with the local operational schedule.

20. A multiradio controller, comprising:
   at least one interface module; and
   a processing module coupled to the at least one interface module, the processing module being configured to:
      receive device information regarding a plurality of wireless communication mediums being supported by one or more radio modules in a wireless communication device;
      formulate a local operational schedule for the one or more radio modules to operate on the plurality of wireless communication mediums based on the device information, the local operational schedule comprising one or more time periods allowed for communication by the one or more radio modules on each of the plurality of supported wireless communication mediums;
      receive, from a radio module, network information regarding an associated wireless communication medium, the network information being used to determine allowed activity periods for communicating in the associated wireless communication medium;

compare the local operational schedule for the associated wireless communication medium with the allowed activity periods for communicating in the associated wireless communication medium; and instruct the radio module to adjust a duration of the allowed activity periods to correspond with the local operational schedule if the duration of the allowed activity periods exceeds the one or more time periods allowed for communication in the local operational schedule.

21. The multiradio controller of claim 20, wherein adjusting the duration of the allowed activity periods is executed through a request to a radio module using the at least one interface module.

22. The multiradio controller of claim 20, wherein adjusting the duration of the allowed activity periods is executed through an instruction to a radio module using the at least one interface module.

* * * * *